United States Patent
Hu

(10) Patent No.: US 11,849,384 B2
(45) Date of Patent: Dec. 19, 2023

(54) USER PLANE REROUTING METHOD AND APPARATUS

(71) Applicant: Huawei Technologies Co., Ltd., Shenzhen (CN)

(72) Inventor: Xiang Hu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 57 days.

(21) Appl. No.: 17/562,721

(22) Filed: Dec. 27, 2021

(65) Prior Publication Data

US 2022/0124601 A1  Apr. 21, 2022

Related U.S. Application Data

(63) Continuation of application No. PCT/CN2020/098561, filed on Jun. 28, 2020.

(30) Foreign Application Priority Data

Jun. 28, 2019 (CN) .......................... 201910578953.9

(51) Int. Cl.
*H04W 40/34* (2009.01)
*H04L 45/00* (2022.01)
(Continued)

(52) U.S. Cl.
CPC ............ *H04W 40/34* (2013.01); *H04L 45/70* (2013.01); *H04L 65/40* (2013.01); *H04L 67/141* (2013.01)

(58) Field of Classification Search
None
See application file for complete search history.

(56) References Cited

U.S. PATENT DOCUMENTS 8,824,471 B2  9/2014  Hui et al.
8,837,277 B2  9/2014  Vasseur et al.
(Continued)

FOREIGN PATENT DOCUMENTS

CN  102395172 A  3/2012
CN  103023770 A  4/2013
(Continued)

OTHER PUBLICATIONS

"3rd Generation Partnership Project; Technical Specification Group Core Network and Terminals; 5G System; Session Management Policy Control Service; Stage 3 (Release 16)," 3GPP TS 29.512 V16.1.0, Total 62 pages, 3rd Generation Partnership Project, Valbonne, France (Jun. 2019).

(Continued)

*Primary Examiner* — Otis L Thompson, Jr.
(74) *Attorney, Agent, or Firm* — Leydig, Voit & Mayer, Ltd.

(57) ABSTRACT

Embodiments of this application provide a user plane rerouting method and apparatus. The method includes: a first network element receives user plane rerouting trigger information sent by a second network element, where the user plane rerouting trigger information is sent when the second network element detects a preset service packet that matches a packet detection rule PDR, and the PDR is used to indicate matching information and an execution rule that are corresponding to the preset service packet triggering user plane rerouting. The first network element further performs the user plane rerouting based on the user plane rerouting trigger information.

19 Claims, 14 Drawing Sheets

(51) Int. Cl.
*H04L 67/141* (2022.01)
*H04L 65/40* (2022.01)

(56) References Cited

U.S. PATENT DOCUMENTS

| | | | | |
|---|---|---|---|---|
| 2016/0105838 | A1* | 4/2016 | Wang | H04W 40/04 |
| | | | | 370/329 |
| 2018/0316615 | A1 | 11/2018 | Shaw et al. | |
| 2018/0317121 | A1* | 11/2018 | Liao | H04W 28/0289 |
| 2019/0158408 | A1 | 5/2019 | Li et al. | |
| 2019/0223047 | A1* | 7/2019 | Gundavelli | H04W 28/0247 |
| 2020/0214054 | A1* | 7/2020 | Qiao | H04W 48/18 |
| 2020/0267085 | A1 | 8/2020 | Nie et al. | |
| 2020/0274799 | A1* | 8/2020 | Mishra | H04L 45/22 |
| 2020/0412833 | A1* | 12/2020 | Yang | H04L 67/141 |
| 2021/0014720 | A1* | 1/2021 | Li | H04W 36/0011 |

FOREIGN PATENT DOCUMENTS

| | | |
|---|---|---|
| CN | 103262481 A | 8/2013 |
| CN | 109548063 A | 3/2019 |
| WO | 2014117641 A1 | 8/2014 |

OTHER PUBLICATIONS

"3rd Generation Partnership Project; Technical Specification Group Core Network and Terminals; Interface between the Control Plane and the User Plane Nodes; Stage 3 (Release 15)," 3GPP TS 29.244 V15.6.0, Total 72 pages, 3rd Generation Partnership Project, Valbonne, France (Jun. 2019).

"Clarification and correction to AF response," 3GPP TSG-WG SA2 Meeting #134, Sapporo, Japan, S2-1908354 revision of S2-1907633, Total 9 pages, 3rd Generation Partnership Project, Valbonne, France (Jun. 24-28, 2019).

Ericsson et al.,"Traffic redirection enhancement," 3GPP TSG-CT4 Meeting #85, Osaka, Japan, C4-184037, total 16 pages, 3rd Generation Partnership Project, Valbonne, France (May 21-25, 2018).

Wang et al.,"Minimizing Controller Response Time Through Flow Redirecting in SDNs," IEEE/ACM Transactions on Networking, vol. 26, No. 1, pp. 562-575, Institute of Electrical and Electronics Engineers, New York, New York (Feb. 2018).

"3rd Generation Partnership Project; Technical Specification Group Services and System Aspects; Policy and charging control architecture (Release 16)," 3GPP TS 23.203 V16.1.0, total 263 pages, 3rd Generation Partnership Project, Valbonne, France (Jun. 2019).

Ericsson, "Traffic redirection enhancement," 3GPP TSG-CT4 Meeting #84, Kunming, China, C4-183227, total 16 pages, 3rd Generation Partnership Project, Valbonne, France (Apr. 16-20, 2018).

Silian, "A Solution Strategy of IP Fast Rerouting Based on BFD Detection," Information and Communications, Sum. No 163, total 3 pages (2016). With English abstract.

"3rd Generation Partnership Project; Technical Specification Group Services and System Aspects; System Architecture for the 5G System; Stage 2 (Release 16)," 3GPP TS 23.501 V16.1.0, total 368 pages, 3rd Generation Partnership Project, Valbonne, France (Jun. 2019).

"3rd Generation Partnership Project; Technical Specification Group Services and System Aspects; Procedures for the 5G System; Stage 2 (Release 16)," 3GPP TS 23.502 V16.1.1, total 495 pages, 3rd Generation Partnership Project, Valbonne, France (Jun. 2019).

"3rd Generation Partnership Project; Technical Specification Group Services and System Aspects; Policy and Charging Control Framework for the 5G System; Stage 2 (Release 16)," 3GPP TS 23.503 V16.1.0, total 99 pages, 3rd Generation Partnership Project, Valbonne, France (Jun. 2019).

"3rd Generation Partnership Project; Technical Specification Group Core Network and Terminals; Interface between the Control Plane and the User Plane Nodes; Stage 3 (Release 16)," 3GPP TS 29.244 V16.0.0, total 217 pages, 3rd Generation Partnership Project, Valbonne, France (Jun. 2019).

* cited by examiner

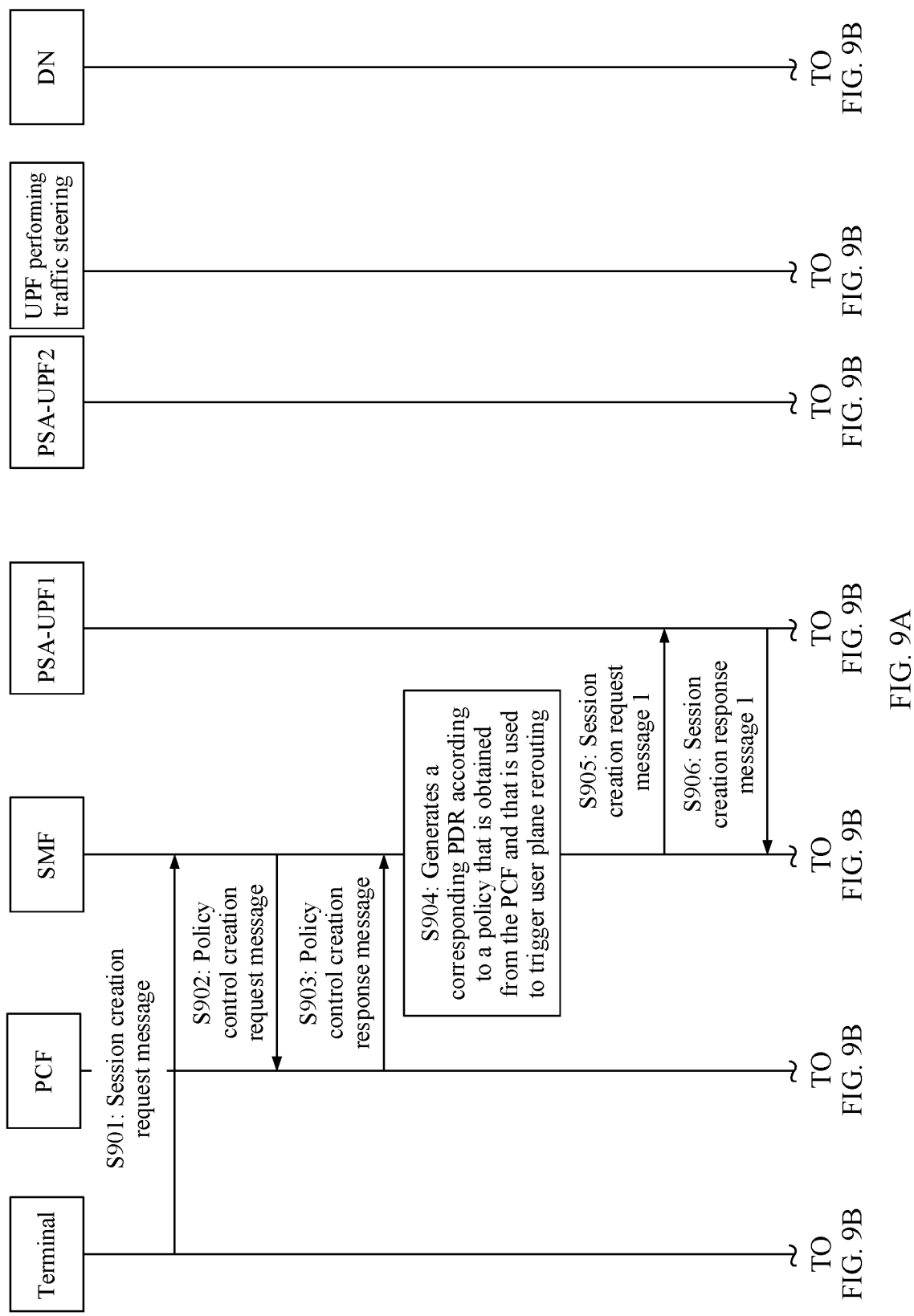

USER PLANE REROUTING METHOD AND APPARATUS

CROSS-REFERENCE TO RELATED APPLICATIONS

This application is a continuation of International Application No. PCT/CN2020/098561, filed on Jun. 28, 2020, which claims priority to Chinese Patent Application No. 201910578953.9, filed on Jun. 28, 2019. The disclosures of the aforementioned applications are hereby incorporated by reference in their entireties.

TECHNICAL FIELD

Embodiments of this application relate to the field of network technologies, and in particular, to a user plane rerouting method and apparatus.

BACKGROUND

In a 5th generation (5G) network architecture, a 5G core network control plane and a 5G core network user plane exchange messages through a corresponding interface, to deliver user policies from the control plane to the user plane and perform processing, for example, reporting events from the user plane to the control plane. In practice, a user plane path may need to be changed.

In a related technology, an application function (AF) entity initiates a user plane path change request to trigger a policy control function (PCF) entity to notify a session management function (SMF) entity to reconfigure a user plane path for a user plane function (UPF) entity through a network exposure function (NEF) entity and a unified data repository (UDR) function entity.

However, in the related technology, a service triggering path AF→NEF→UDR→PCF→SMF is implemented with a lot of services involved. In addition, the AF is a function entity planned on a third-party application (APP), and falls out of a control scope of an operator. To implement proper path planning, the operator needs to open internal service planning of the operator's network to the third-party APP through the NEF. This results in security problems.

SUMMARY

Embodiments of this application provide a user plane rerouting method and apparatus. This improves operator network security.

According to a first aspect, an embodiment of this application provides a user plane rerouting method. The method includes:
  a first network element receives user plane rerouting trigger information sent by a second network element, where the user plane rerouting trigger information is sent when the second network element detects a preset service packet that matches a packet detection rule (PDR), and the PDR is used to indicate matching information and an execution rule that are corresponding to the preset service packet triggering user plane rerouting; and
  the first network element performs the user plane rerouting based on the user plane rerouting trigger information.

In the user plane rerouting method according to the first aspect, the user plane rerouting trigger information sent by the second network element is received by the first network element, where the user plane rerouting trigger information is sent when the second network element detects the preset service packet that matches the packet detection rule (PDR), and the PDR is used to indicate the matching information and the execution rule that are corresponding to the preset service packet triggering the user plane rerouting. The first network element further performs the user plane rerouting based on the user plane rerouting trigger information. It can be learned that compared with a manner of triggering a user plane path change by using a function entity planned on a non-operator third-party APP in the related technology, in this embodiment of this application, a network element within a control scope of an operator can adjust a user plane path based on service awareness, and a function entity planned on a third-party APP does not need to trigger a user plane path change. This improves operator network security.

In a possible implementation, the PDR includes: packet detection information (PDI) and a usage reporting rule (URR), where the PDI is used to indicate the matching information corresponding to the preset service packet, and the URR is used to indicate the execution rule corresponding to the preset service packet.

In a possible implementation, the method further includes:
  the first network element generates the PDR according to a preset policy used to trigger the user plane rerouting, and sends the PDR to the second network element.

In a possible implementation, the method further includes:
  the first network element obtains, from a third network element, a preset policy that is in the third network element and that is used to trigger the user plane rerouting; and
  the first network element generates the PDR according to the preset policy and sends the PDR to the second network element.

In a possible implementation, the method further includes:
  the first network element sends an activation message to the second network element, where the activation message is used to indicate to activate a preset PDR in the second network element.

In a possible implementation, the PDR is carried in a first session creation request message sent by the first network element to the second network element, and the first session creation request message is used to indicate to create a session between the first network element and the second network element.

In a possible implementation, the activation message is carried in a second session creation request message sent by the first network element to the second network element, and the second session creation request message is used to indicate to create a session between the first network element and the second network element.

In a possible implementation, that the first network element performs the user plane rerouting based on the user plane rerouting trigger information includes:
  the first network element sends a first session request message to a fourth network element and a second session request message to a fifth network element, where the first session request message is used to indicate to create or update a session between the first network element and the fourth network element, the second session request message is used to indicate to create or update a session between the first network element and the fifth network element, and the second session request message carries a service packet traffic steering rule allocated to the fifth network element; and/or the first network element sends a session update request message to the second network element, where the session update request message is used to indicate to update the PDR in the second network element.

In a possible implementation, that the first network element performs the user plane rerouting based on the user plane rerouting trigger information includes:

the first network element creates a session with a fourth network element; and the first network element deletes the session with the second network element.

In a possible implementation, that the first network element creates a session with a fourth network element includes:

the first network element sends a third session creation request message to the fourth network element, where the third session creation request message is used to indicate to create the session between the first network element and the fourth network element.

In a possible implementation, that the first network element deletes the session with the second network element includes:

the first network element sends a session delete request message to the second network element, where the session delete request message is used to indicate to delete the session between the first network element and the second network element.

In a possible implementation, before the first network element performs the user plane rerouting based on the user plane rerouting trigger information, the method further includes:

the first network element sends the user plane rerouting trigger information to the third network element; and the first network element receives indication information sent by the third network element, where the indication information is used to indicate the first network element to perform the user plane rerouting.

According to a second aspect, an embodiment of this application provides a user plane rerouting method. The method includes:

a first network element monitors a service packet according to a packet detection rule (PDR), where the PDR is used to indicate matching information and an execution rule that are corresponding to a preset service packet triggering user plane rerouting; and if the first network element detects the preset service packet that matches the PDR, the first network element sends user plane rerouting trigger information to a second network element according to the execution rule.

In the user plane rerouting method according to the second aspect, the first network element monitors the service packet according to the packet detection rule (PDR). If the first network element detects the preset service packet that matches the PDR, the first network element sends the user plane rerouting trigger information to the second network element according to the execution rule, so that the second network element performs the user plane rerouting based on the user plane rerouting trigger information. It can be learned that, compared with a manner of triggering a user plane path change by using a function entity planned on a non-operator third-party APP in the related technology, in this embodiment of this application, a network element within a control scope of an operator can adjust a user plane path based on service awareness, and a function entity planned on a third-party APP does not need to trigger a user plane path change. This improves operator network security.

In a possible implementation, the PDR includes: packet detection information (PDI) and a usage reporting rule (URR). The PDI is used to indicate the matching information corresponding to the preset service packet. The URR is used to indicate the execution rule corresponding to the preset service packet.

In a possible implementation, that a first network element monitors a service packet according to a packet detection rule (PDR) includes:

the first network element determines attribute information of the service packet;

the first network element matches the attribute information with the PDI;

if the attribute information matches the PDI, the service packet detected by the first network element is the preset service packet that matches the PDR; and/or if the attribute information does not match the PDI, the service packet detected by the first network element is not the preset service packet that matches the PDR.

In a possible implementation, the method further includes:

the first network element receives the PDR sent by the second network element, where the PDR is generated by the second network element according to a preset policy used to trigger the user plane rerouting, or the PDR is generated after the second network element obtains a policy used to trigger the user plane rerouting from a third network element.

In a possible implementation, the method further includes:

the first network element receives an activation message sent by the second network element, where the activation message is used to indicate to activate the preset PDR in the first network element.

In a possible implementation, the PDR is carried in a first session creation request message received by the first network element from the second network element, where the first session creation request message is used to indicate to create a session between the second network element and the first network element.

In a possible implementation, the activation message is carried in a second session creation request message received by the first network element from the second network element, where the second session creation request message is used to indicate to create a session between the second network element and the first network element.

In a possible implementation, the method further includes:

the first network element receives a session update request message sent by the second network element, where the session update request message is used to indicate to update the PDR in the first network element.

In a possible implementation, the method further includes:

the first network element receives a session delete request message sent by the second network element, where the session delete request message is used to indicate to delete the session between the second network element and the first network element.

According to a third aspect, an embodiment of this application provides a network element, and the network element is a first network element. The first network element includes:

a first receiving module, configured to receive user plane rerouting trigger information sent by a second network element, where the user plane rerouting trigger information is sent when the second network element detects a preset service packet that matches a packet detection rule (PDR), and the PDR is used to indicate matching information and an execution rule that are corresponding to the preset service packet triggering the user plane rerouting; and a rerouting module, configured to perform the user plane rerouting based on the user plane rerouting trigger information.

In a possible implementation, the PDR includes: packet detection information (PDI) and a usage reporting rule (URR). The PDI is used to indicate the matching information corresponding to the preset service packet. The URR is used to indicate the execution rule corresponding to the preset service packet.

In a possible implementation, the first network element further includes:
a first generation module, configured to generate the PDR according to a preset policy used to trigger the user plane rerouting; and
a first sending module, configured to send the PDR to the second network element.

In a possible implementation, the first network element further includes:
an obtaining module, configured to obtain a preset policy, from a third network element, that is in a third network element and that is used to trigger the user plane rerouting;
a second generation module, configured to generate the PDR according to the policy; and
a second sending module, configured to send the PDR to the second network element.

In a possible implementation, the first network element further includes:
a third sending module, configured to send an activation message to the second network element, where the activation message is used to indicate to activate the preset PDR in the second network element.

In a possible implementation, the PDR is carried in a first session creation request message sent by the first network element to the second network element, and the first session creation request message is used to indicate to create a session between the first network element and the second network element.

In a possible implementation, the activation message is carried in a second session creation request message sent by the first network element to the second network element, and the second session creation request message is used to indicate to create a session between the first network element and the second network element.

In a possible implementation, the rerouting module is specifically configured to:
send a first session request message to a fourth network element and a second session request message to a fifth network element, where the first session request message is used to indicate to create or update a session between the first network element and the fourth network element, the second session request message is used to indicate to create or update a session between the first network element and the fifth network element, and the second session request message carries a service packet traffic steering rule allocated to the fifth network element; and/or send a session update request message to the second network element, where the session update request message is used to indicate to update the PDR in the second network element.

In a possible implementation, the rerouting module includes:
a creation unit, configured to create the session with the fourth network element; and
a deletion unit, configured to delete the session with the second network element.

In a possible implementation, the creation unit is specifically configured to:
send a third session creation request message to the fourth network element, where the third session creation request message is used to indicate to create the session between the first network element and the fourth network element.

In a possible implementation, the deletion unit is specifically configured to:
send a session delete request message to the second network element, where the session delete request message is used to indicate to delete the session between the first network element and the second network element.

In a possible implementation, the first network element further includes:
a fourth sending module, configured to send the user plane rerouting trigger information to the third network element; and
a second receiving module, configured to receive indication information sent by the third network element, where the indication information is used to indicate the first network element to perform the user plane rerouting.

According to a fourth aspect, an embodiment of this application provides a network element, and the network element is a first network element. The first network element includes:
a monitoring module, configured to monitor a service packet according to a packet detection rule (PDR), where the PDR is used to indicate matching information and an execution rule that are corresponding to a preset service packet triggering user plane rerouting; and
a sending module, configured to send user plane rerouting trigger information to a second network element according to the execution rule when the monitoring module detects the preset service packet that matches the PDR.

In a possible implementation, the PDR includes: packet detection information (PDI) and a usage reporting rule (URR). The PDI is used to indicate the matching information corresponding to the preset service packet. The URR is used to indicate the execution rule corresponding to the preset service packet.

In a possible implementation, the monitoring module is specifically configured to:
determine attribute information of the service packet;
match the attribute information with the PDI;
if the attribute information matches the PDI, detect that the service packet is the preset service packet that matches the PDR; and/or
if the attribute information does not match the PDI, detect that the service packet is not the preset service packet that matches the PDR.

In a possible implementation, the first network element further includes:

a first receiving module, configured to receive the PDR sent by the second network element, where the PDR is generated by the second network element according to a preset policy used to trigger the user plane rerouting, or the PDR is generated after the second network element obtains a policy used to trigger the user plane rerouting from a third network element.

In a possible implementation, the first network element further includes:

a second receiving module, configured to receive an activation message sent by the second network element, where the activation message is used to indicate to activate the preset PDR in the first network element.

In a possible implementation, the PDR is carried in a first session creation request message received by the first network element from the second network element, and the first session creation request message is used to indicate to create a session between the second network element and the first network element.

In a possible implementation, the activation message is carried in a second session creation request message received by the first network element from the second network element, and the second session creation request message is used to indicate to create a session between the second network element and the first network element.

In a possible implementation, the first network element further includes:

a third receiving module, configured to receive a session update request message sent by the second network element, where the session update request message is used to indicate to update the PDR in the first network element.

In a possible implementation, the first network element further includes:

a fourth receiving module, configured to receive a session delete request message sent by the second network element, where the session delete request message is used to indicate to delete the session between the second network element and the first network element.

According to a fifth aspect, an embodiment of this application provides a network element, including a processor and a memory.

The memory is configured to store program instructions.

The processor is configured to invoke and execute the program instructions stored in the memory, and when the processor executes the program instructions stored in the memory, the network element is configured to perform the method according to any one of the implementations of the first aspect or the second aspect.

According to a sixth aspect, an embodiment of this application provides a computer-readable storage medium. The computer-readable storage medium stores instructions, and when the instructions are run on a computer, the computer is enabled to perform the method according to any one of the implementations of the first aspect or the second aspect.

According to a seventh aspect, an embodiment of this application provides a chip system. The chip system includes a processor and may further include a memory, and is configured to implement the method according to any one of the implementations of the first aspect or the second aspect. The chip system may include a chip, or may include a chip and another discrete component.

According to an eighth aspect, an embodiment of this application provides a program. When executed by a processor, the program is configured to perform the method according to any one of the implementations of the first aspect or the second aspect.

According to a ninth aspect, an embodiment of this application provides a computer program product including instructions. When the computer program product runs on a computer, the computer is enabled to perform the method according to any one of the implementations of the first aspect or the second aspect.

BRIEF DESCRIPTION OF DRAWINGS

FIG. 9A, FIG. 9B, and FIG. 9C are a schematic flowchart of a user plane rerouting method according to another embodiment of this application;

DESCRIPTION OF EMBODIMENTS

Network architectures and some terms related to embodiments of this application are first explained and described.

Figure 1:
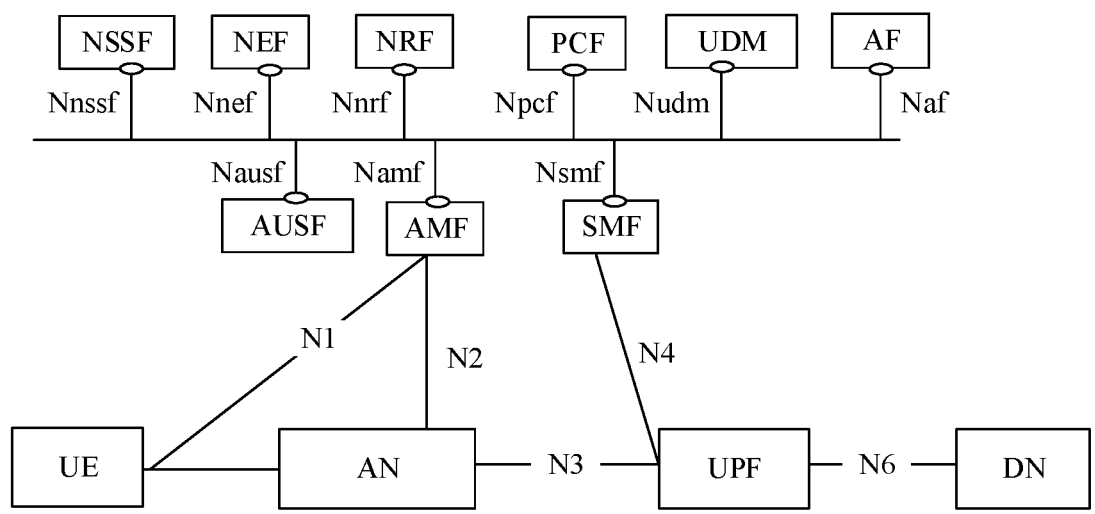
FIG. 1 is a schematic diagram 1 depicting an architecture of a 5G network according to an embodiment of this application.

FIG. 1 is a schematic diagram 1 depicting an architecture of a 5G network according to an embodiment of this application. As shown in FIG. 1, a control plane network element in the 5G network architecture provides external service interfaces. A 5G core network control plane and a 5G core network user plane exchange messages through a corresponding service interface, to deliver user policies from the control plane to the user plane and perform processing, for example, reporting events from the user plane to the control plane.

For example, a network slice selection function (NSSF) entity provides an external service interface Nnssf, an NEF provides an external service interface Nnef, a network repository function (NRF) entity provides an external service interface Nnrf, a PCF provides a service interface Npcf, a unified data management (UDM) provides an external service interface Nudm, an AF provides an external service interface Naf, an authentication server function (AUSF) entity provides an external service interface Nausf, an access and mobility management function (AMF) entity provides an external service interface Namf, and an SMF provides an external service interface Nsmf. In addition, a terminal is connected to the AMF through an N1 interface, the AMF is connected to an access network (AN) through an N2 interface, the AN is connected to a UPF through an N3 interface, the UPF is connected to the SMF through an N4 interface, and the UPF is connected to a data network (DN) through an N6 interface.

Figure 2:
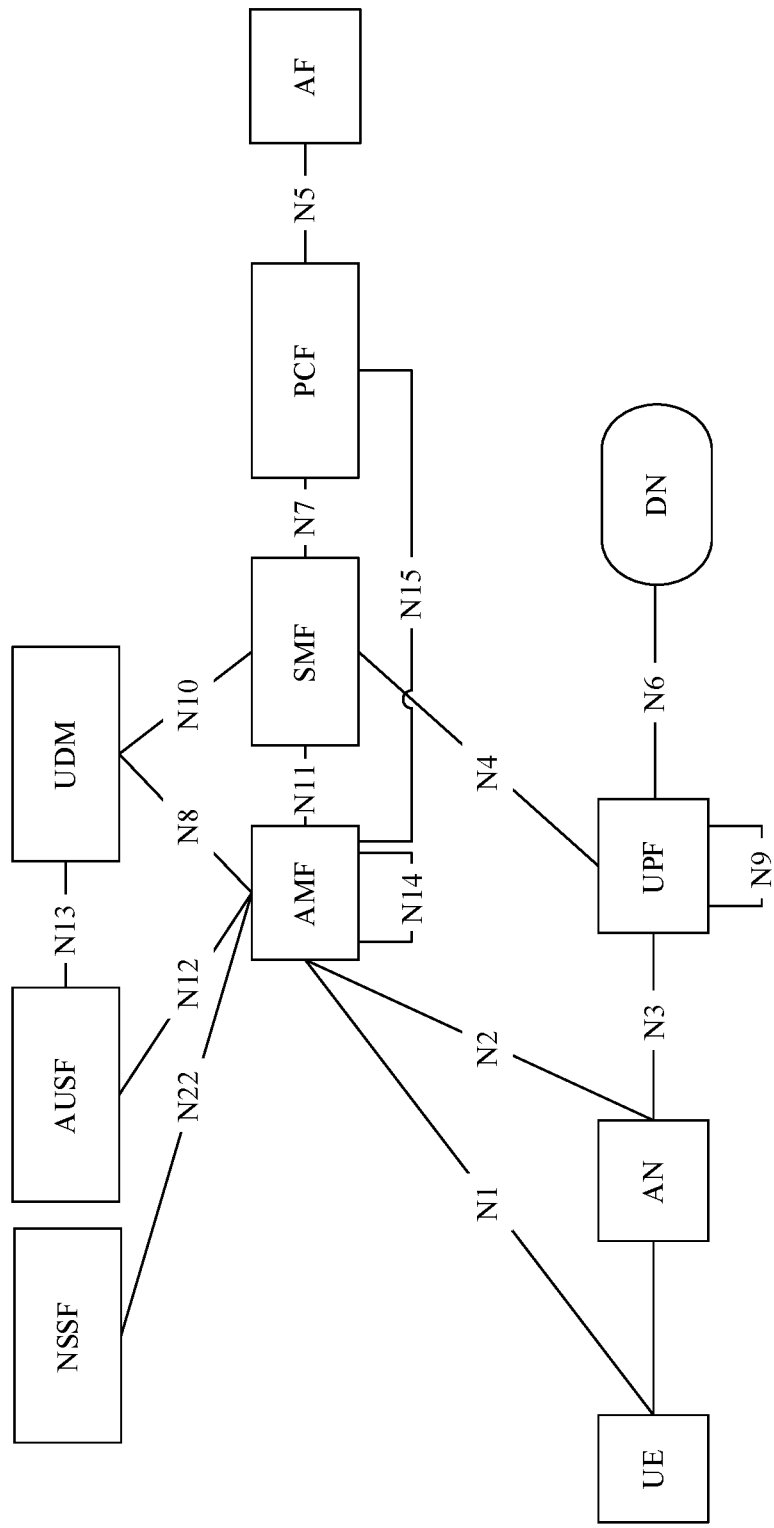
FIG. 2 is a schematic diagram 2 depicting an architecture of a 5G network according to an embodiment of this application.

FIG. 2 is a schematic diagram 2 depicting an architecture of a 5G network according to an embodiment of this application. As shown in FIG. 2, two network elements that need to be interconnected in the 5G network architecture have a one-to-one defined inter-NE interface. A 5G core network control plane and a 5G core network user plane exchange messages through a corresponding inter-NE interface, to deliver user policies from the control plane to the user plane and perform processing, for example, reporting events from the user plane to the control plane.

For example, N1 is an inter-NE interface between a terminal and an AMF, N2 is an inter-NE interface between an AN and the AMF, N3 is an inter-NE interface between the AN and a UPF, N4 is an inter-NE interface between the UPF and an SMF, N5 is an inter-NE interface between a PCF and an AF, N6 is an inter-NE interface between the UPF and a DN, N7 is an inter-NE interface between the SMF and the PCF, N8 is an inter-NE interface between the AMF and a UDM, N9 is an inter-NE interface between UPFs, N10 is an inter-NE interface between the UDM and the SMF, N11 is an inter-NE interface between the AMF and the SMF, N12 is an inter-NE interface between the AMF and an AUSF, N13 is an inter-NE interface between the AUSF and the UDM, N14 is an inter-NE interface between AMFs, N15 is an inter-NE interface between the AMF and the PCF, and N22 is an inter-NE interface between an NSSF and the AMF.

Figure 3:
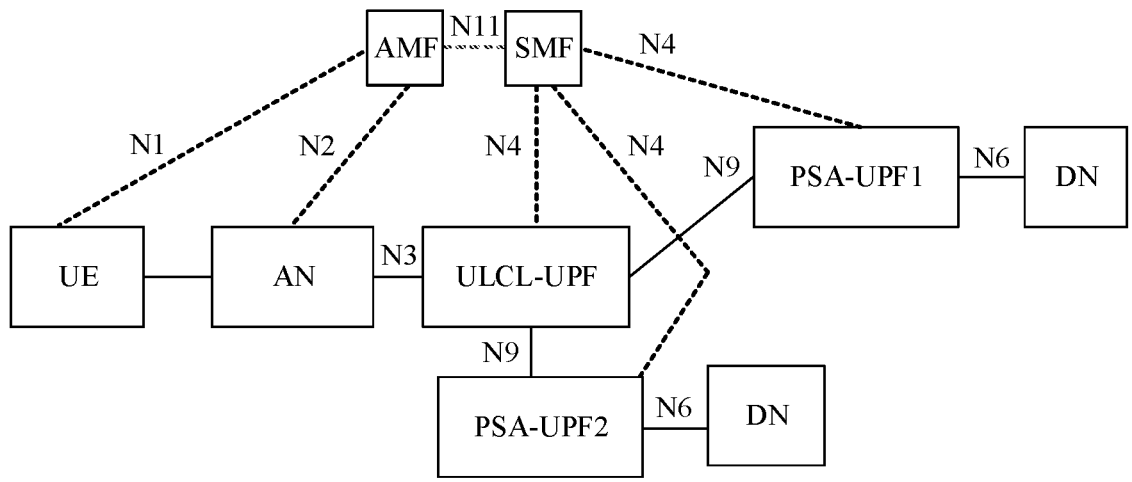
FIG. 3 is a schematic diagram depicting a user plane architecture of uplink packet traffic steering according to the related technology.

A scenario in which a protocol data unit (PDU) session may support multiple PDU session anchors (PSAs) is defined in the related technology. FIG. 3 is a schematic diagram depicting a user plane architecture of uplink packet traffic steering according to the related technology. As shown in FIG. 3, uplink packet traffic steering (Uplink Classifier, ULCL)-UPF is added for an Internet protocol version 4 (IPv4) session and a non-multi-homed (Multihome) Internet protocol version 6 (IPv6) session, to perform traffic steering processing on a single session with multiple service paths. For example, the traffic steering processing may be performed by a PSA-UPF1 and a PSA-UPF2.

Figure 4:
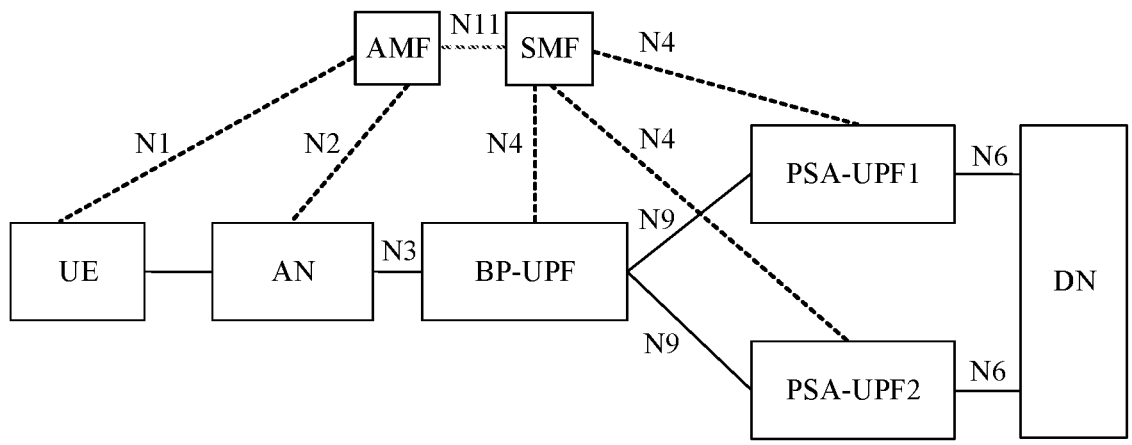
FIG. 4 is a schematic diagram depicting a user plane architecture of a multi-homed PDU session according to the related technology.

FIG. 4 is a schematic diagram depicting a user plane architecture of a multi-homed PDU session according to the related technology. As shown in FIG. 4, a branch node (Branch Point, BP)-UPF of a multi-homed IPv6 session is added to implement traffic steering processing on a single session with multiple service paths. For example, a PSA-UPF1 and a PSA-UPF2 may perform the traffic steering processing.

Figure 5:
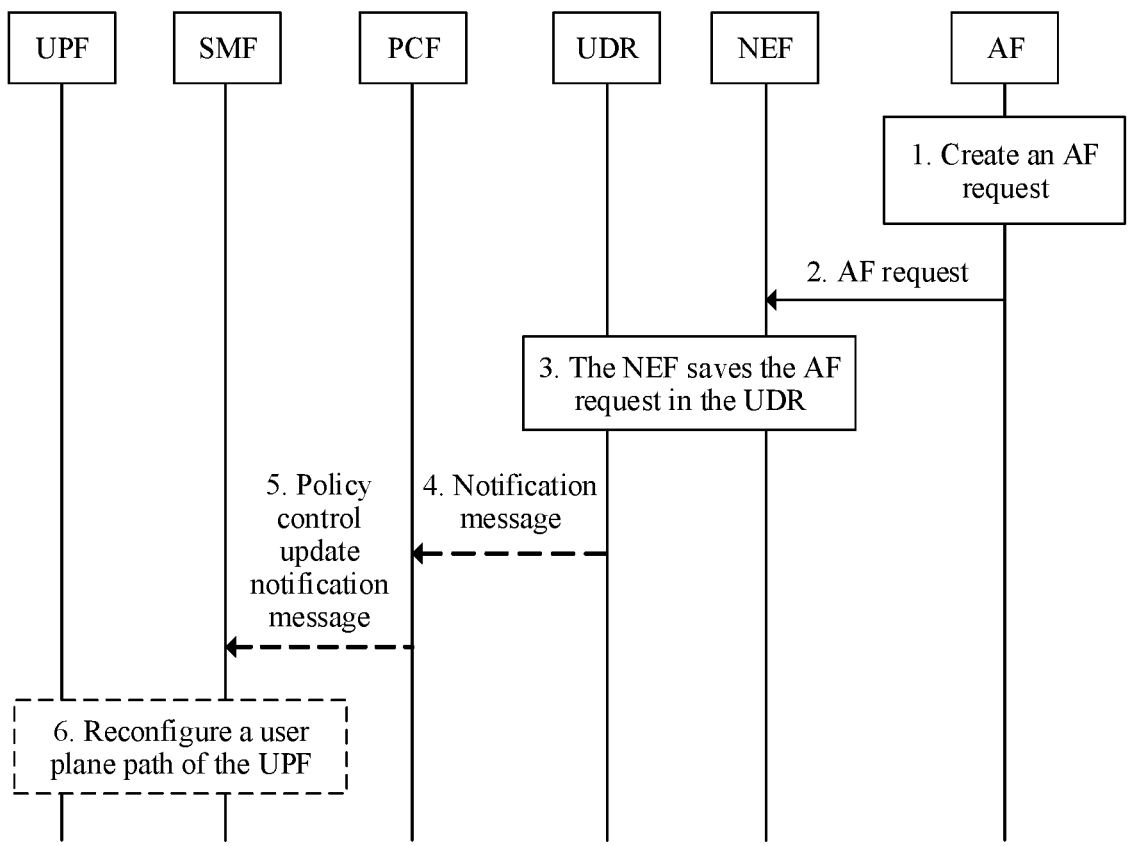
FIG. 5 is a schematic flowchart depicting that an AF triggers user plane rerouting according to the related technology.

FIG. 5 is a schematic flowchart depicting that an AF triggers user plane rerouting according to the related technology. As shown in FIG. 5, the AF in the related technology may sense a terminal that accesses services of the AF and location information of the terminal. The AF initiates a user plane path change request, and an NEF and a UDR trigger a PCF to notify an SMF to reconfigure a user plane path of a UPF. For example, the AF creates an AF request and sends the AF request to the NEF, so that the NEF saves the AF request in the UDR, where the AF request may include but is not limited to the following: a creation message, an update message, or a delete message. Further, because the PCF has subscribed to an AF request change notification service from the UDR, the UDR sends a notification message to the PCF, so that the PCF sends a policy control update notification message to the SMF, and the SMF reconfigures the user plane path of the UPF. Therefore, the user plane path is switched to a server closest to the terminal.

However, in the related technology, a service triggering path AF→NEF→UDR→PCF→SMF is implemented with a plurality of services involved. In addition, the AF is a function entity planned on a third-party APP, and falls out of a control scope of an operator. To implement proper path planning, the operator needs to open internal service planning of the operator's network to the third-party APP through the NEF. This results in security problems.

According to a user plane rerouting method and apparatus provided in the embodiments of this application, a second network element within the control scope of the operator monitors a service packet according to a PDR, and sends user plane rerouting trigger information to a first network element when detecting a preset service packet matching the PDR. In this way, the first network element may learn, based on the received user plane rerouting trigger information, that a terminal is accessing the preset service packet triggering user plane rerouting, and further perform the user plane rerouting. It can be learned that, compared with a manner of triggering a user plane path change by using a function entity planned on a non-operator third-party APP in the related technology, in this embodiment of this application, a network element within the control scope of the operator can adjust a user plane path based on service awareness, and the function entity planned on the third-party APP does not need to trigger a user plane path change. This improves operator network security.

In this application, "at least one" refers to one or more, and "a plurality of" refers to two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof means any combination of the items, including any combination of one item (piece) or a plurality of items (pieces). For example, at least one of a, b, or c may represent: a, b, c, a and b, a and c, b and c, or a, b, and c, where a, b, and c may be singular or plural.

Specific embodiments are used below to describe in detail the technical solutions in this application. The following several specific embodiments may be combined with each other, and a same or similar concept or process may not be described repeatedly in some embodiments.

Figure 6:
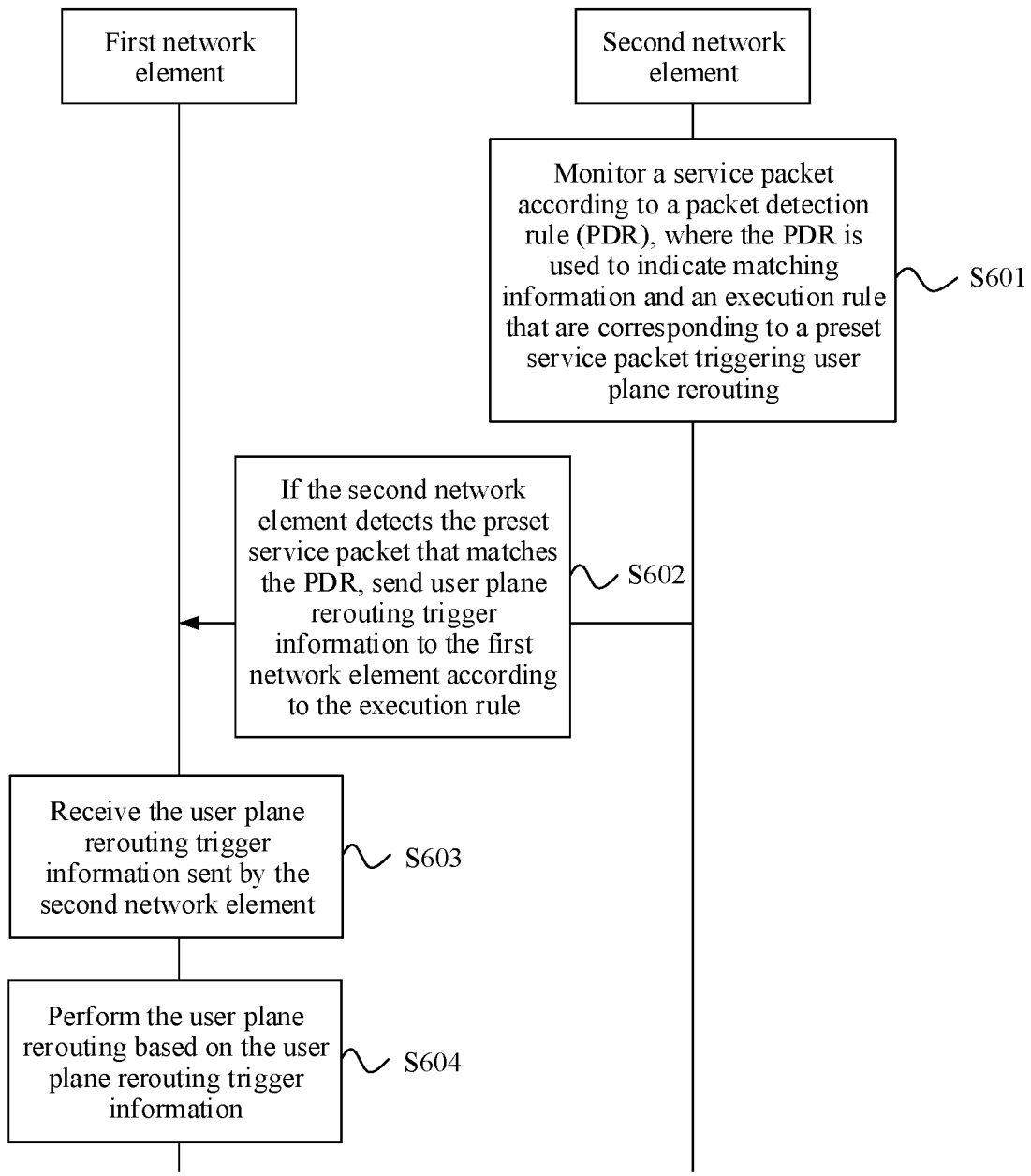
FIG. 6 is a schematic flowchart of a user plane rerouting method according to an embodiment of this application.

FIG. 6 is a schematic flowchart of a user plane rerouting method according to an embodiment of this application. As shown in FIG. 6, the method in this embodiment of this application may include the following steps.

Step S601: A second network element monitors a service packet according to a packet detection rule (PDR), where the PDR is used to indicate matching information and an execution rule that are corresponding to a preset service packet triggering user plane rerouting.

For example, the second network element in this embodiment of this application may be a source anchor PSA-UPF1 corresponding to an initial session of a terminal.

The preset service packet in this embodiment of this application is a packet corresponding to a preset service triggering the user plane rerouting. For example, the preset service may include but is not limited to the following: an access service occurring in a preset server Internet protocol (IP) address segment, or an access service occurring on a preset application or an APP.

The PDR in this embodiment of this application may include but is not limited to the following: packet detection information (PDI) and a usage reporting rule (URR). The PDR may further include a QoS enforcement rule (QER) and/or a forwarding action rule (FAR).

For example, the PDI is used to indicate the matching information corresponding to the preset service packet. For example, the PDI may include but is not limited to the following: a fully qualified tunnel endpoint identifier (F-TEID) of the preset packet, a source destination port, a source destination IP address, an IP protocol type, and an application identity document (ID).

For example, the URR, the QoS execution rule, and/or the FAR are all used to indicate the execution rule corresponding to the preset service packet.

Optionally, when receiving any service packet in this step, the second network element first determines attribute information of the service packet. For example, the attribute information of the service packet may include but is not limited to the following: an F-TEID, a source destination port, a source destination IP address, an IP protocol type, and an application ID of the service packet. Then, the second network element compares and matches the attribute information with the PDI. If the attribute information of the service packet matches the PDI, the second network element detects that the service packet is the preset service packet matching the PDR. If the attribute information of the service packet does not match the PDI, the second network element detects that the service packet is not the preset service packet matching the PDR.

For example, it is assumed that the PDI includes the F-TEID, the source destination port, the source destination IP address, and the IP protocol type of the preset packet. It is assumed that the attribute information of the service packet includes the F-TEID, the source destination port, the source destination IP address, and the IP protocol type of the service packet. If the F-TEID of the service packet is the same as the F-TEID of the preset packet, the source destination port of the service packet is the same as the source and destination port of the preset packet, the source destination IP addresses of the service packet is the same as the source destination IP address of the preset packet, and the IP protocol type of the service packet is the same as the IP protocol type of the preset packet, the second network element determines that the attribute information of the service packet matches the PDI, to detect that the service packet is the preset service packet matching the PDR. Otherwise (for example, the F-TEID of the service packet is different from the F-TEID of the preset packet, the source and destination ports of the service packet is different from the source destination port of the preset packet, the source destination IP address of the service packet is different from the source destination IP address of the preset packet, or the IP protocol type of the service packet is different from the IP protocol type of the preset packet), the second network element determines that the attribute information of the service packet does not match the PDI, to detect that the service packet is not the preset service packet matching the PDR.

The following embodiment of this application describes manners of obtaining the PDR in the second network element.

In a possible implementation, the first network element generates the PDR according to a preset policy used to trigger the user plane rerouting, and sends the PDR to the second network element. Correspondingly, the second network element receives the PDR sent by the first network element.

For example, the first network element in this embodiment of this application may be an SMF.

The preset policy used to trigger the user plane rerouting in this embodiment of this application may include but is not limited to any one of the following:

a policy in which when accessing the preset service, the terminal needs to select a specific UPF as a UPF performing traffic steering to insert session information, select another specific UPF as a new local anchor to create new session information, and deliver, to the UPF performing traffic steering, an indication used to indicate to separately distribute a service flow (including a plurality of service packets) by using a source anchor and the new local anchor;

a policy in which when accessing the preset service, the terminal needs to select the specific UPF as the new local anchor to create the new session information and delete session information of the source anchor;

a policy in which if a content delivery network (CDN) server is deployed within a first preset distance range of the new local anchor, the service flow of the preset service may be distributed by using the new local anchor, so that the CDN server can be directly accessed to improve quality of service and service access efficiency; or a policy in which if a vehicle server is deployed in a DN network corresponding to the new local anchor within a second preset distance range of a self-driving vehicle, when accessing a preset service, a terminal in the self-driving vehicle may access a service by using the new local anchor.

In this implementation, the policy used to trigger the user plane rerouting is preset on the first network element, and the first network element may generate the PDR according to the preset policy, and then send the generated PDR to the second network element. For example, the PDR may be carried in a first session creation request message sent by the first network element to the second network element, and the first session creation request message is used to indicate to create a session between the first network element and the second network element. Certainly, the PDR may further be carried in another message (for example, a session update request message or the like) sent by the first network element to the second network element.

In another possible implementation, the first network element obtains, from a third network element, a policy that is preset on the third network element and that is used to trigger the user plane rerouting. The first network element generates the PDR according to the policy, and sends the PDR to the second network element. Correspondingly, the second network element receives the PDR sent by the first network element.

For example, the third network element in this embodiment of this application may be a PCF.

In this implementation, the policy used to trigger the user plane rerouting is preset on the third network element. The first network element may obtain, from the third network element, the policy preset on the third network element, generate the PDR according to the obtained policy, and send the generated PDR to the second network element. For example, the PDR may be carried in the first session creation request message sent by the first network element to the second network element. Certainly, the PDR may further be carried in another message (for example, the session update request message or the like) sent by the first network element to the second network element.

In another possible implementation, the first network element sends an activation message to the second network element, where the activation message is used to indicate to activate a PDR preset on the second network element. Correspondingly, the second network element receives the activation message sent by the first network element.

In this implementation, the PDR is preset on the second network element, and the first network element activates the preset PDR preset on the second network element by sending the activation message to the second network element. For example, the activation message may be carried in a second session creation request message sent by the first network element to the second network element, and the second session creation request message is used to indicate to create the session between the second network element and the first network element. Certainly, the activation message may further be carried in another message (for example, the session update request message or the like) sent by the first network element to the second network element.

Step S602: If the second network element detects the preset service packet that matches the PDR, the second network element sends user plane rerouting trigger information to the first network element according to the execution rule.

In this step, if the second network element detects the preset service packet that matches the PDR, the second network element sends the user plane rerouting trigger information to the first network element according to the execution rule in the PDR. In this way, the first network element may learn, based on the user plane rerouting trigger information, that the terminal is accessing the preset service packet triggering the user plane rerouting and further perform the user plane rerouting.

Step S603: The first network element receives the user plane rerouting trigger information sent by the second network element.

In this step, the first network element receives the user plane rerouting trigger information sent by the second network element, to learn that the terminal is accessing the preset service packet that triggers the user plane rerouting, where the user plane rerouting trigger information is sent by the second network element when the second network element detects the preset service packet that matches the packet detection rule (PDR).

Step S604: The first network element performs the user plane rerouting based on the user plane rerouting trigger information.

In this step, the first network element performs user plane rerouting operations based on the user plane rerouting trigger information. Specifically, performing the user plane rerouting operations may include but is not limited to the following several implementations.

In a possible implementation, the first network element sends a first session request message to a fourth network element and a second session request message to a fifth network element, where the first session request message is used to indicate to create or update a session between the first network element and the fourth network element, the second session request message is used to indicate to create or update a session between the first network element and the fifth network element, and the second session request message carries a service packet traffic steering rule allocated to the fifth network element; and/or the first network element sends the session update request message to the second network element, where the session update request message is used to indicate to update the PDR in the second network element. Correspondingly, the second network element receives the session update request message sent by the first network.

For example, the fourth network element in this embodiment of this application may be a new local anchor PSA-UPF2 corresponding to a new session of the terminal.

For example, for an IPv4 session and/or a non-multi-homed IPv6 session, the fifth network element in this embodiment of this application may be a ULCL-UPF. For a multi-homed IPv6 session, the fifth network element in this embodiment of this application may be a BP-UPF.

In this implementation, the first network element sends, to the fourth network element, the first session request message that is used to indicate to create or update the session between the first network element and the fourth network element, and sends, to a fifth network element, the second session request message that is used to indicate to create or update the session between the first network element and the fifth network element. The second session request message may further carry the service packet traffic steering rule allocated to the fifth network element, so that the fifth network element distributes the service packet according to the service packet traffic steering rule.

It should be noted that, if the first network element has created the session between the first network element and the fourth network element, the first session request message is used to indicate to update the session between the first network element and the fourth network element. If the first network element has not created the session between the first network element and the fourth network element, the first session request message is used to indicate to create the session between the first network element and the fourth network element; and/or if the first network element has created the session between the first network element and the fifth network element, the second session request message is used to indicate to update the session between the first network element and the fifth network element. If the first network element has not created the session between the first network element and the fifth network element, the second session request message is used to indicate to create the session between the first network element and the fifth network element.

In this implementation, the first network element may further send the session update request message to the second network element. Correspondingly, the second network element receives the session update request message sent by the first network. The session update request message is used to indicate to update the PDR in the second network element.

For example, the session update request message may be used to indicate to update interface tunnel information carried in an FAR action of an original PDR to interface tunnel information between the second network element and the fifth network element (for example, an interface address and/or an F-TEID).

Optionally, if the PDR in the second network element is generated by the first network element after the first network element obtains, from the third network element, the policy used to trigger the user plane rerouting, and the PDR is sent to the second network element. Therefore, before performing the user plane rerouting based on the user plane rerouting triggering information, the first network element first sends the user plane rerouting trigger information to the third network element, so that the third network element sends, to the first network element and according to the preset policy used to trigger the user plane rerouting, indication information used to indicate the first network element to perform the user plane rerouting. Then, the first network element receives the indication information sent by the third network element.

In another possible implementation, the first network element creates the session with the fourth network element, and deletes the session with the second network element.

For example, the first network element may send, to the fourth network element, a third session creation request message used to indicate to create a session between the first network element and the fourth network element. Correspondingly, after receiving the third session creation request message sent by the first network element, the fourth network element may further send, to the first network element, a session creation response message corresponding to the third session creation request message, to create the session between the first network element and the fourth network element.

For example, the first network element may send, to the second network element, a session delete request message used to indicate to delete the session between the first network element and the second network element. Correspondingly, after receiving the session delete request message sent by the first network element, the second network element may further send, to the first network element, a session delete response message corresponding to the session delete request message, to delete the session between the first network element and the second network element.

In this embodiment of this application, the second network element monitors the service packet according to the packet detection rule (PDR). If the second network element detects the preset service packet that matches the PDR, the second network element sends the user plane rerouting trigger information to the first network element according to the execution rule. The first network element further performs the user plane rerouting based on the received user plane rerouting trigger information. Compared with a manner of triggering a user plane path change by using a function entity planned on a non-operator third-party APP in the related technology, in this embodiment of this application, the second network element within a control scope of an operator monitors the service packet according to the PDR, and sends the user plane rerouting trigger information to the first network element when detecting the preset service packet matching the PDR. In this way, the first network element may learn, based on the received user plane rerouting trigger information, that the terminal is accessing the preset service packet triggering the user plane rerouting, and further perform the user plane rerouting. It can be learned that, in this embodiment of this application, a network element within the control scope of the operator can adjust a user plane path based on service awareness, and the function entity planned on the third-party APP does not need to trigger the user plane path change. This improves operator network security.

Figure 7A:
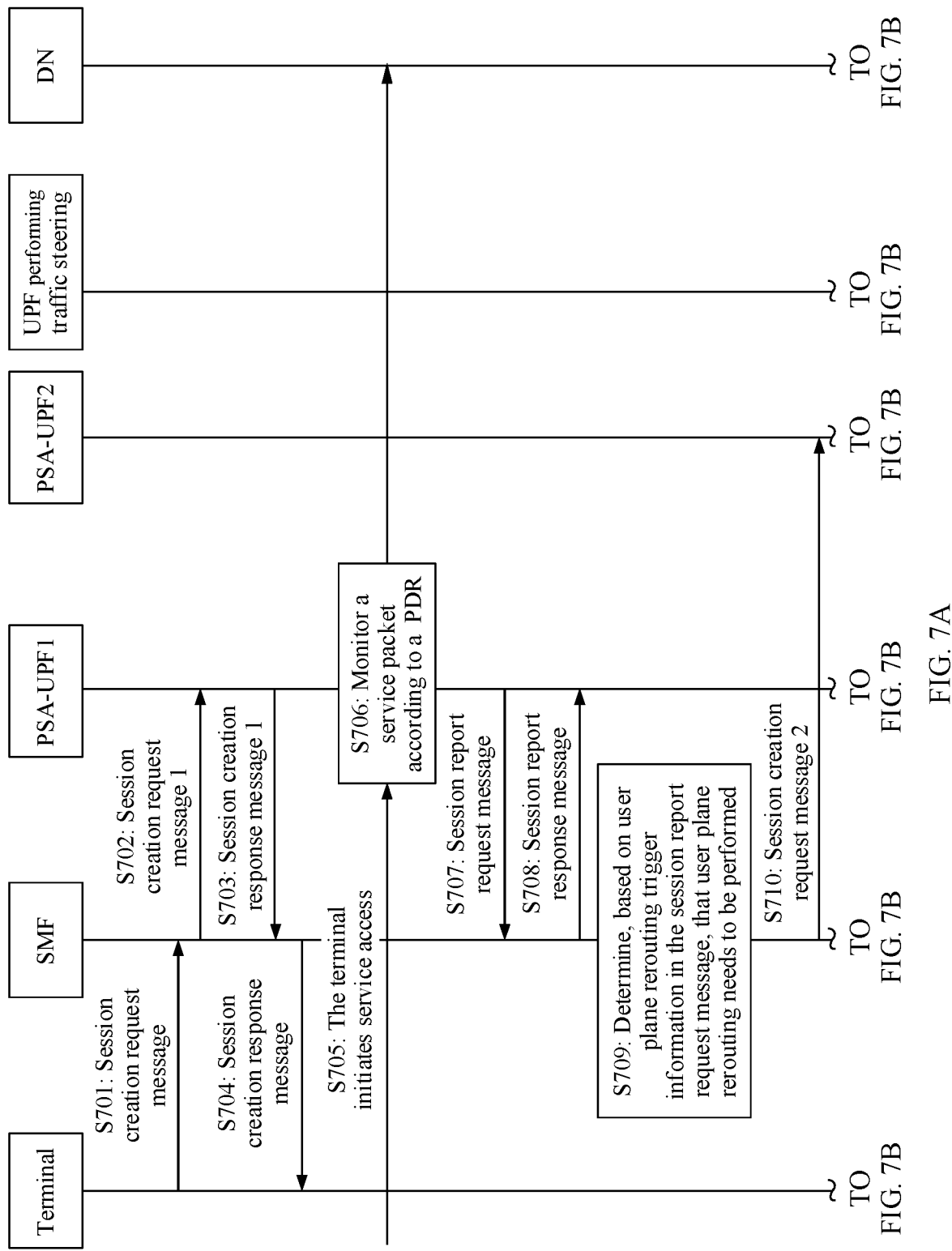
FIG. 7A and FIG. 7B are a schematic flowchart of a user plane rerouting method according to another embodiment of this application.
Figure 7B:
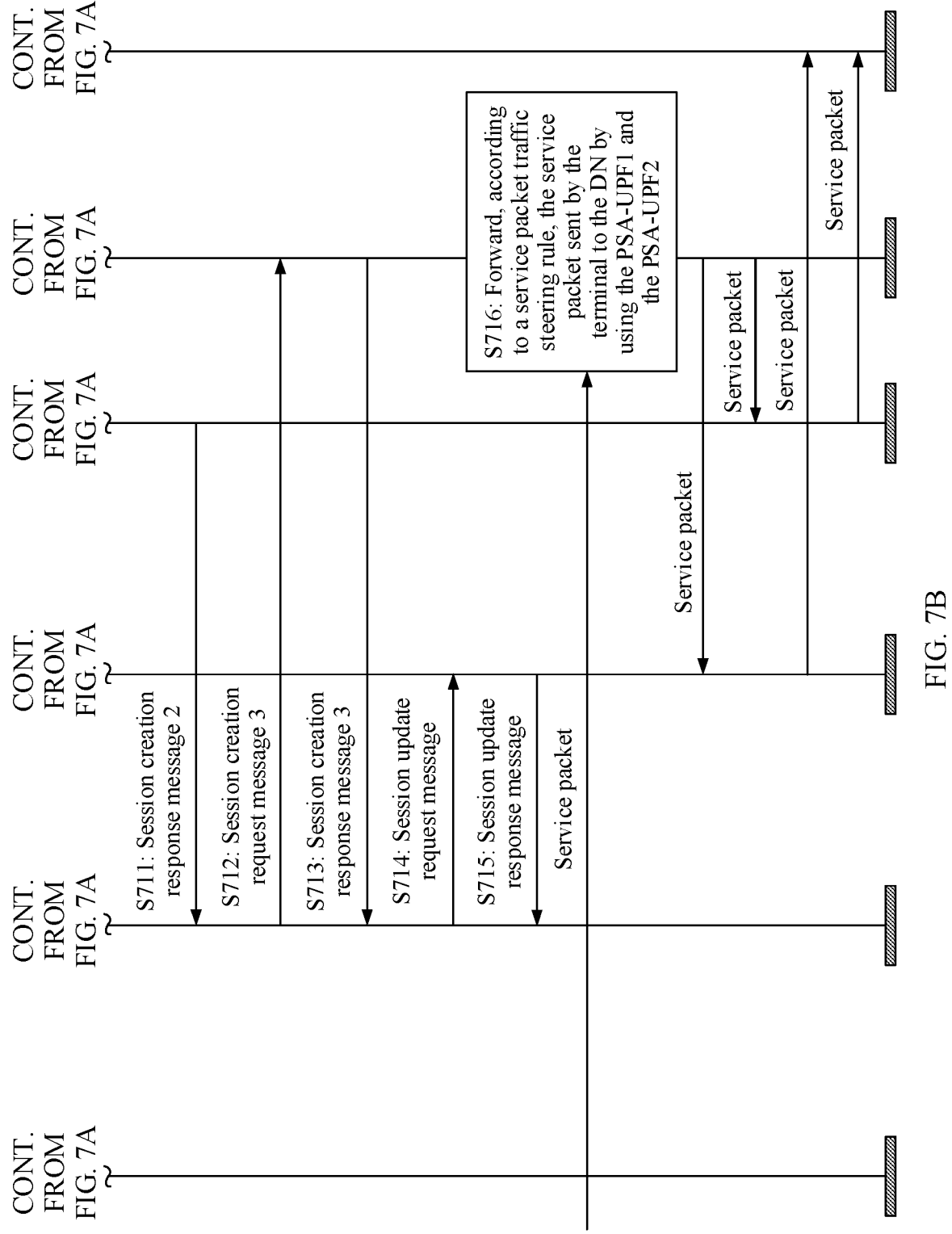

FIG. 7A and FIG. 7B are a schematic flowchart of a user plane rerouting method according to another embodiment of this application. Based on the foregoing embodiment, this embodiment of this application describes a user plane rerouting method by using an example in which a PSA-UPF1 monitors a service packet according to a PDR delivered by an SMF and sends user plane rerouting trigger information to the SMF when detecting a preset service packet matching the PDR, so that the SMF performs user plane rerouting operations of creating a session between a UPF performing traffic steering and a PSA-UPF2 and delivering a service packet traffic steering rule, and the like.

In this embodiment of this application, a policy used to trigger user plane rerouting is preset on the SMF. For example, when accessing a preset service, a terminal needs to select a specific UPF as the UPF performing traffic steering to insert session information and another specific UPF as a new local anchor PSA-UPF2 to create new session information, and deliver, to the UPF performing traffic steering, a policy used to indicate to separately distribute a service flow (including a plurality of service packets) by using a source anchor PSA-UPF1 and the new local anchor PSA-UPF2, and the like.

In this embodiment, the SMF may generate a corresponding PDR according to the preset policy, where the PDR may include but is not limited to: PDI and a URR.

For example, for an IPv4 session and/or a non-multi-homed IPv6 session, the UPF performing traffic steering in this embodiment of this application may be a ULCL-UPF. For a multi-homed IPv6 session, the UPF performing traffic steering in this embodiment of this application may be a BP-UPF.

As shown in FIG. 7A and FIG. 7B, the method in this embodiment of this application may include the following steps.

Step S701: The terminal sends a session creation request message to the SMF.

Step S702: The SMF sends a session creation request message 1 to the PSA-UPF1, where the session creation request message 1 is used to indicate to create a session between the SMF and the PSA-UPF1.

For example, the session creation request message 1 carries the PDR generated by the SMF according to the preset policy, and the PDR may include but is not limited to: the PDI and the URR.

TABLE 1

A schematic table showing a structure of URR information elements (Information Elements, IE) in the session creation request message 1

| Octets 1 and 2 | | Create URR IE type = 6 (decimal) | | | | |
| Octets 3 and 4 | | Length = n | | | | |
| | Optional | | Interface | | | |
| IE | or mandatory | Condition | Sxa | Sxb | Sxc | N4 IE type |
| URR ID | Mandatory | This IE uniquely identifies a session usage reporting rule. | X | X | X | X URR ID |

TABLE 1-continued

A schematic table showing a structure of URR information elements (Information Elements, IE) in the session creation request message 1

| Measurement method | Mandatory | This IE indicates a method for measuring network resource usage. For example, whether to measure by volume, time, volume and time, or event. | X | X | X | X | Measurement method |
| --- | --- | --- | --- | --- | --- | --- | --- |
| Reporting triggers | Mandatory | This IE indicates to trigger reporting the network resource usage to a control plane function entity, for example, periodic reporting, usage reaching a preset threshold, or envelope closure. | X | X | X | X | Reporting triggers |

As shown in Table 1, the reporting triggers are added to the URR information elements, to indicate to trigger reporting the network resource usage to the control plane (CP) function entity. A specific format of the reporting triggers may be shown in Table 2. When bit 7-RERT (rerouting service) of octet 6 is set to 1, it indicates that a reporting request is sent when a rerouting service flow is detected.

Bit 8—linked usage reporting (LIUSA) event: When the bit is set to 1, it indicates that a linked usage report is reported. For example, when a linked usage reporting rule initiates usage reporting, a usage reporting request according to the usage reporting rule needs to be triggered at the same time.

TABLE 2

A schematic table showing a structure of reporting triggers

| | Bit | | | | | | | |
| --- | --- | --- | --- | --- | --- | --- | --- | --- |
| Octets | 8 | 7 | 6 | 5 | 4 | 3 | 2 | 1 |
| 1 to 2 | | | | Type = 37 (decimal) | | | | |
| 3 to 4 | | | | Length = n | | | | |
| 5 | LIUSA | DROTH | STOPT | START | QUHTI | TIMTH | VOLTH | PERIO |
| 6 | Spare | RERT | EVEQU | EVETH | MACAR | ENVCL | TIMQU | VOLQU |
| 7 to (n + 4) | | | These octets exist only when explicitly specified. | | | | | |

An octet 5 may be encoded as follows:
Bit 1—periodic reporting (PERM): When the bit is set to 1, it indicates a periodic report is reported;
Bit 2—volume threshold (VOLTH): When the bit is set to 1, it indicates that a report is reported when data usage reaches a volume threshold;
Bit 3—time threshold (TIMTH): When the bit is set to 1, it indicates that a report is reported when time usage reaches the time threshold;
Bit 4—quota holding time (QUHTI): When the bit is set to 1, it indicates that a report is reported when no data packet is received within a time period exceeding the quota holding time;
Bit 5—start of traffic (START): When the bit is set to 1, it indicates that a report is reported when a service data flow (SDF) is detected or an application service is started;
Bit 6—stop of traffic (STOPT): When the bit is set to 1, it indicates that a report is reported when the SDF is detected or the application service is stopped;
Bit 7—dropped downlink traffic threshold (DROTH): When the bit is set to 1, it indicates that a report is reported when a quantity of dropped downlink traffic reaches the threshold;

Encoding of an octet 6 may be as follows:
Bit 1—volume quota (VOLQU): When the bit is set to 1, it indicates that a report is reported when the volume quota is exhausted;
Bit 2—time quota (TIMQU): When the bit is set to 1, it indicates that a report is reported when the time quota is exhausted;
Bit 3—envelope closure (ENVCL): When the bit is set to 1, it indicates that a report is reported when an envelope closure condition is met;
Bit 4—MAC addresses reporting (MACAR): When the bit is set to 1, it indicates that a report is reported when the MAC (Ethernet) address is used as a source address of an uplink (UL) data frame sent by UE;
Bit 5—event threshold (EVETH): When the bit is set to 1, it indicates that a report is reported when the event threshold is reached;
Bit 6—event quota (EVEQU): When the bit is set to 1, it indicates that a report is reported when the event quota is reached;
Bit 7—rerouting of traffic (RERT): When the bit is set to 1, it indicates that a report is reported when a rerouting SDF or an application service is detected;
Bit 8—This bit is reserved for future use and set to 0.

Step S703: The PSA-UPF1 sends a session creation response message 1 to the SMF.

Step S704: The SMF sends the session creation response message to the terminal.

Step S705: The terminal initiates service access.

Step S706: The PSA-UPF1 monitors the service packet according to the PDR.

For example, if the PSA-UPF1 detects the preset service packet that matches the PDI in the PDR, the PSA-UPF1 performs step S707.

Step S707: The PSA-UPF1 sends the session report request message to the SMF.

For example, when detecting the preset service packet that matches the PDI in the PDR, the PSA-UPF1 sends the session report request message to the SMF according to the URR in the PDR (including reporting triggers that indicate service rerouting), where the session report request message carries the user plane rerouting trigger information.

TABLE 3

A schematic table showing a structure of a usage report
(Usage Report) IE in the session report request message

| Octets 1 and 2 | | Usage Report IE type = 80 (decimal) | | | | |
| Octets 3 and 4 | | Length = n | | | | |

| | Optional | | | Interface | | |
| --- | --- | --- | --- | --- | --- | --- |
| IE | or mandatory | Condition | Sxa | Sxb | Sxc | N4 | IE type |
| URR ID | Mandatory | This IE identifies a URR of reported usage. | X | X | X | X | URR ID |
| UR-SEQN Usage report - session sequence number | Mandatory | This IE indicates a sequence number of a usage report IE triggered by a usage reporting rule in a session. | X | X | X | X | UR-SEQN |
| Usage report trigger cause | Mandatory | This IE indicates a cause that triggers usage reporting. | X | X | X | X | Usage report trigger cause |

As shown in Table 3, the usage report trigger cause is used to indicate a cause that triggers usage reporting. In this embodiment of this application, a traffic rerouting trigger cause, or referred to as user plane rerouting trigger information, is added. A specific format of the usage report trigger cause may be shown in Table 4. When a bit 2—RERT of an octet 7 is set to 1, it indicates that a rerouting service flow is detected (that is, the rerouting traffic trigger cause or the user-plane rerouting triggering information).

The octet 5 may be encoded as follows:

Bit 1—PERIO: When the bit is set to 1, it indicates a periodic report;

Bit 2—VOLTH: When the bit is set to 1, it indicates that the data usage reaches the usage threshold;

Bit 3—TIMTH: When the bit is set to 1, it indicates that the time usage reaches the time threshold;

Bit 4—QUHTI: When the bit is set to 1, it indicates that no data packet is received within the time period exceeding the quota holding time;

Bit 5—START: When the bit is set to 1, it indicates that a service is started;

Bit 6—STOPT: When the bit is set to 1, it indicates that the service is stopped;

Bit 7—DROTH: When the bit is set to 1, it indicates that a quantity of discarded downlink traffic reaches the threshold;

Bit 8—immediate report (IMMER) (it indicates that URR reporting is triggered immediately after a message is received from a CP): If the bit is set to 1, it indicates that an immediate usage report request is triggered based on a demand of the CP function entity.

The octet 6 may be encoded as follows:

Bit 1—VOLQU: When the bit is set to 1, it indicates that the volume quota is exhausted;

TABLE 4

A schematic table showing a structure of the usage report trigger cause

| | Bit | | | | | | | |
| --- | --- | --- | --- | --- | --- | --- | --- | --- |
| Octets | 8 | 7 | 6 | 5 | 4 | 3 | 2 | 1 |
| 1 to 2 | | | | Type = 63 (decimal) | | | | |
| 3 to 4 | | | | Length = n | | | | |
| 5 | IMMER | DROTH | STOPT | START | QUHTI | TIMTH | VOLTH | PERIO |
| 6 | EVETH | MACAR | ENVCL | MONIT | TERMR | LIUSA | TIMQU | VOLQU |
| 7 | Spare | Spare | Spare | Spare | Spare | Spare | RERT | EVEQU |
| 8 to (n + 4) | | | These octets exist only when explicitly specified. | | | | | |

Bit 2—TIMQU: When the bit is set to 1, it indicates that the time quota is exhausted;

Bit 3—LIUSA: When the bit is set to 1, it indicates a linked usage a report is reported. For example, a usage report is reported according to a usage reporting rule because a usage report is reported according to a linked usage reporting rule;

Bit 4—termination report (TERMR): When the bit is set to 1, it indicates that a usage report is reported (in a PFCP session delete response) due to termination of a PFCP session, or a usage report is reported (in a PFCP session modification response) because the URR is removed;

Bit 5—monitoring time (MONIT): When the bit is set to 1, it indicates that a usage report is reported according to the URR because the monitoring time is reached;

Bit 6—ENVCL: When the bit is set to 1, it indicates that a usage report is generated when an envelope is closed;

Bit 7—MACAR: When the bit is set to 1, it indicates usage reporting is initiated when the MAC (Ethernet) address is used as the source address of an uplink (UL) data frame sent by the UE;

Bit 8—EVETH: When the bit is set to 1, it indicates that the usage report is generated when the event threshold is reached.

The octet 7 may be encoded as follows:

Bit 1—EVEQU: When the bit is set to 1, it indicates that the event quota is exhausted;

Bit 2—RERT: When the bit is set to 1, it indicates that the rerouting SDF or the application service is detected;

Bits 3 to 8: These bits are reserved for future use and set to 0.

Step S708: The SMF sends a session report response message to the PSA-UPF1.

Step S709: The SMF determines, based on the user plane rerouting trigger information in the session report request message, that the user plane rerouting needs to be performed.

For example, the SMF determines, based on the user plane rerouting triggering information in the session report request message, that the preset service for which the session needs to be created between the UPF performing traffic steering and the PSA-UPF2 and to which a service packet traffic steering rule is delivered has been triggered, and therefore the user plane rerouting needs to be performed.

Step S710: The SMF sends a session creation request message 2 to the PSA-UPF2, where the session creation request message 2 is used to indicate to create a session between the SMF and the PSA-UPF2.

Step S711: The PSA-UPF2 sends a session creation response message 2 to the SMF.

Step S712: The SMF sends a session creation request message 3 to the UPF performing traffic steering, where the session creation request message 3 is used to indicate to create a session between the SMF and the UPF that performs traffic steering.

For example, the session creation request message 3 carries the service packet traffic steering rule allocated to the UPF performing traffic steering, so that the UPF performing traffic steering distributes the service packet by using the source anchor PSA-UPF1 and the new local anchor PSA-UPF2 according to the service packet traffic steering rule.

Step S713: The UPF performing traffic steering sends a session creation response message 3 to the SMF.

Step S714: The SMF sends a session update request message to the PSA-UPF1, where the session update request message is used to indicate to update the PDR in the PSA-UPF1.

For example, the session update request message is used to indicate to update interface tunnel information carried in an FAR action of an original PDR in the PSA-UPF1 to interface tunnel information (for example, an interface address and/or an F-TEID) between the PSA-UPF1 and the UPF performing traffic steering.

Step S715: The PSA-UPF1 sends a session update response message to the SMF.

Step S716: The UPF performing traffic steering forwards, according to the service packet traffic steering rule, a service packet sent by the terminal to a DN by using the PSA-UPF1 and the PSA-UPF2.

For example, the UPF performing traffic steering may distribute, according to the service packet traffic steering rule, the preset service packet to the PSA-UPF2 for accessing a data network, and may still forward another service packet to the PSA-UPF1 for continuing to access the data network.

In this embodiment of this application, the PSA-UPF 1 may monitor the service packet according to the PDR, and send the user plane rerouting trigger information to the SMF when detecting the preset service packet matching the PDR. The SMF may learn, based on the user plane rerouting triggering information, that the preset service for which the session needs to be created between the UPF performing traffic steering and the PSA-UPF2 and to which the service packet traffic steering rule is delivered has been triggered. The SMF further performs a session creation procedure between the UPF performing traffic steering and the PSA-UPF2, to distribute a specific service flow to a corresponding anchor UPF for accessing the data network. It can be learned that in this embodiment of this application, user plane path adjustment based on service awareness can be implemented without a need to use a function entity planned on a third-party APP to sense and trigger the user plane rerouting. This improves operator network security.

Figure 8A:
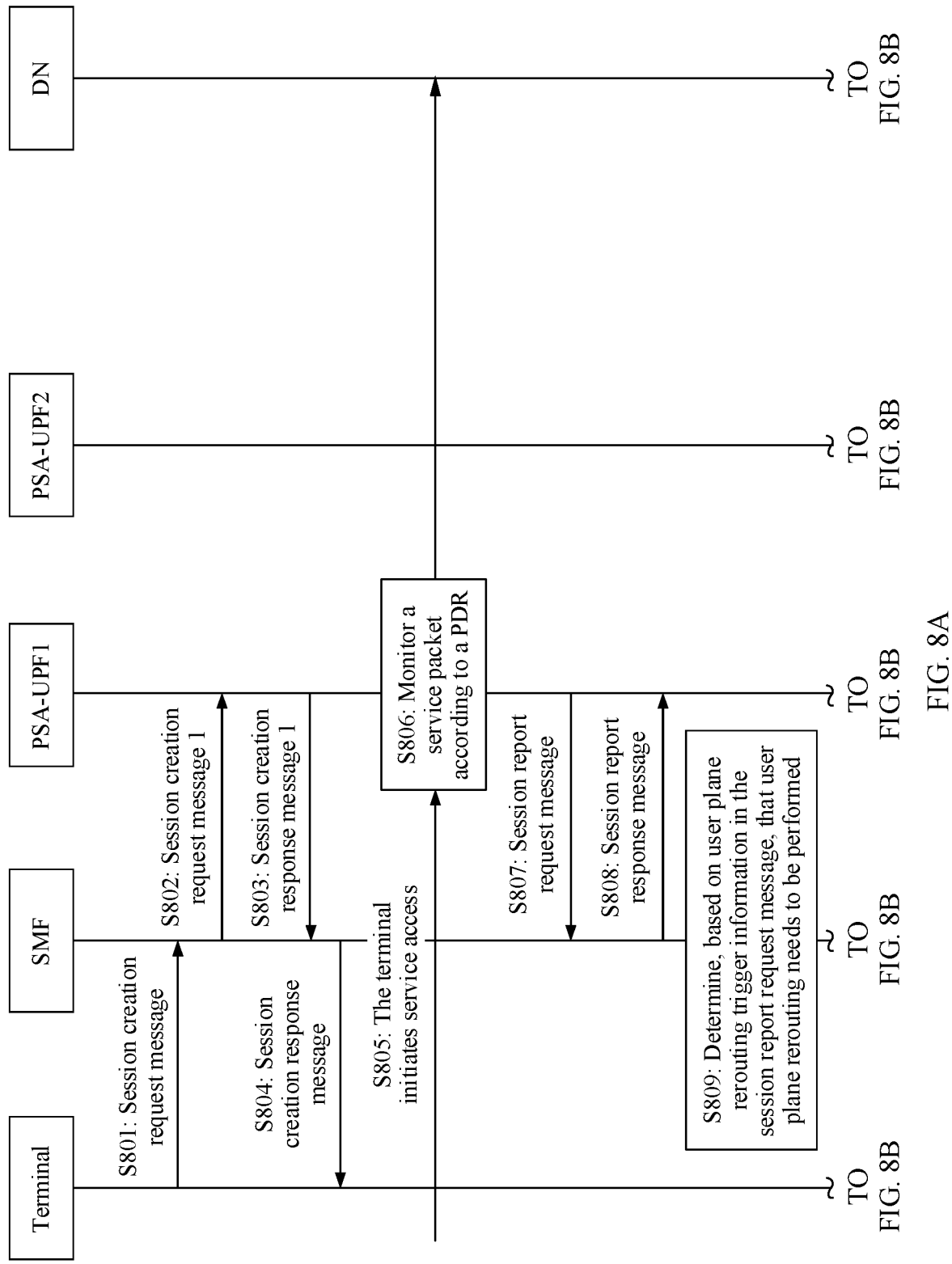
FIG. 8A and FIG. 8B are a schematic flowchart of a user plane rerouting method according to another embodiment of this application.
Figure 8B:
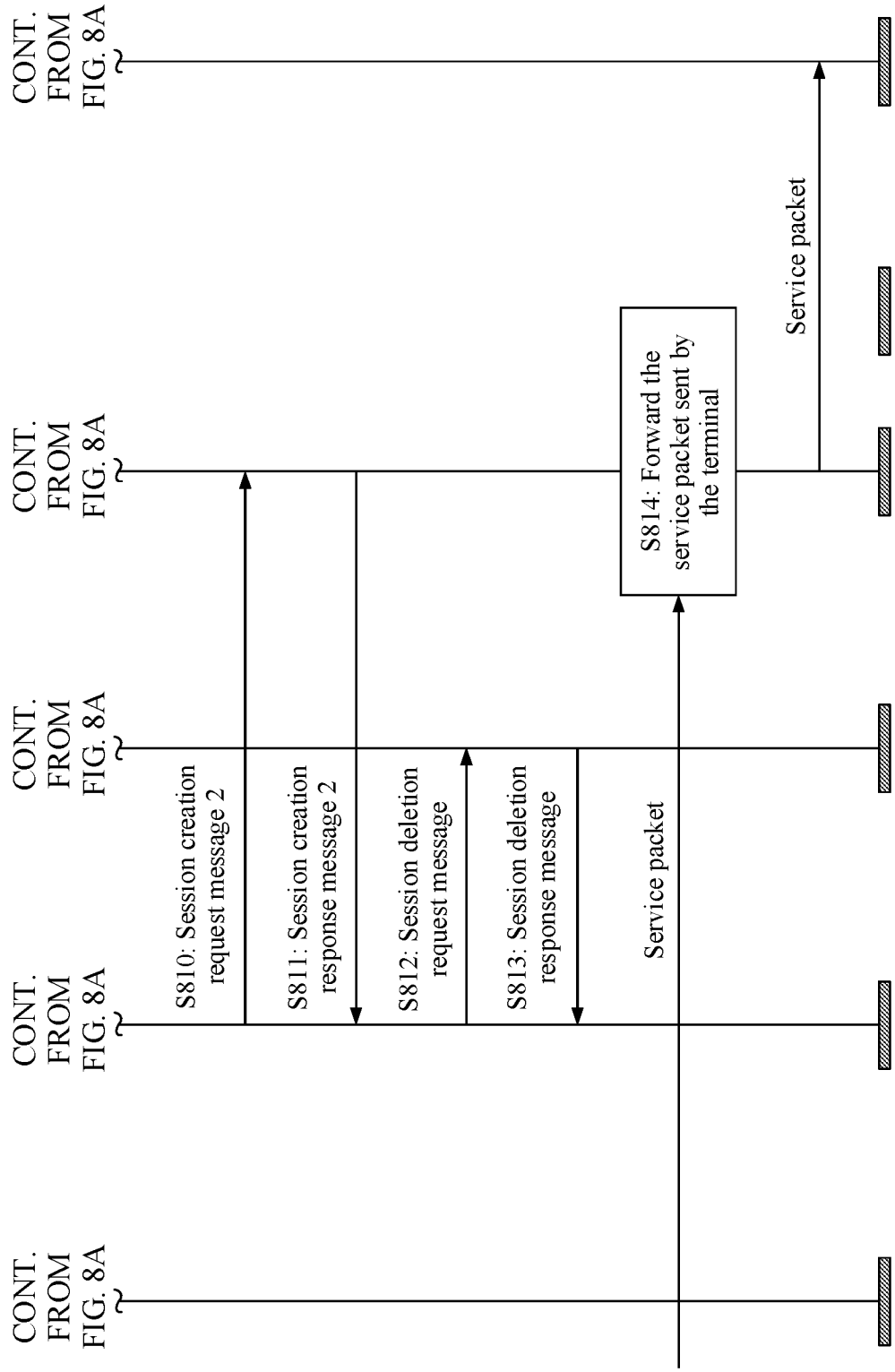

FIG. 8A and FIG. 8B are a schematic flowchart of a user plane rerouting method according to another embodiment of this application. Based on the foregoing embodiment, this embodiment of this application describes the user plane rerouting method by using an example in which a PSA-UPF1 monitors a service packet according to a PDR delivered by an SMF and sends user plane rerouting trigger information to the SMF when detecting a preset service packet matching the PDR, so that the SMF performs user plane rerouting operations of creating a session with a PSA-UPF2, deleting a session with the PSA-UPF1, and the like.

In this embodiment of this application, a policy used to trigger user plane rerouting is preset on the SMF. For example, when accessing a preset service, a terminal needs to select a specific UPF as a new local anchor PSA-UPF2 to create new session information and delete session information of a source anchor PSA-UPF1, and the like.

In this embodiment, the SMF may generate the corresponding PDR according to the preset policy, where the PDR may include but is not limited to: PDI and a URR.

As shown in FIG. 8A and FIG. 8B, the method in this embodiment of this application may include the following steps.

Step S801: The terminal sends a session creation request message to the SMF.

Step S802: The SMF sends a session creation request message 1 to the PSA-UPF1, where the session creation request message 1 is used to indicate to create the session between the SMF and the PSA-UPF1.

For example, the session creation request message 1 carries the PDR generated by the SMF according to the preset policy, and the PDR may include but is not limited to: the PDI and the URR.

Structures of URR information elements in the session creation request message 1 are shown in Table 1 and Table 2. Details are not described herein again.

Step S803: The PSA-UPF1 sends a session creation response message 1 to the SMF.

Step S804: The SMF sends the session creation response message to the terminal.

Step S805: The terminal initiates service access.

Step S806: The PSA-UPF1 monitors the service packet according to the PDR.

For example, if the PSA-UPF1 detects the preset service packet that matches the PDI in the PDR, the PSA-UPF1 performs step S807.

Step S807: The PSA-UPF1 sends a session report request message to the SMF.

For example, when detecting the preset service packet that matches the PDI in the PDR, the PSA-UPF1 sends the session report request message to the SMF according to the URR in the PDR (including reporting triggers that indicate service rerouting), where the session report request message carries the user plane rerouting trigger information.

A structure of a usage report IE in the session report request message is shown in Table 3 and Table 4. Details are not described herein again.

Step S808: The SMF sends a session report response message to the PSA-UPF1.

Step S809: The SMF determines, based on the user plane rerouting trigger information in the session report request message, that the user plane rerouting needs to be performed.

For example, the SMF determines, based on the user plane rerouting triggering information in the session report request message, that the preset service for which the session with the PSA-UPF2 needs to be created and the session with the PSA-UPF1 needs to be deleted has been triggered, and therefore the user plane rerouting needs to be performed.

Step S810: The SMF sends a session creation request message 2 to the PSA-UPF2, where the session creation request message 2 is used to indicate to create the session between the SMF and the PSA-UPF2.

Step S811: The PSA-UPF2 sends a session creation response message 2 to the SMF.

Step S812: The SMF sends a session delete request message to the PSA-UPF1, where the session delete request message is used to indicate to delete the session between the SMF and the PSA-UPF1.

Step S813: The PSA-UPF1 sends a session delete response message to the SMF.

Step S814: The PSA-UPF2 forwards a service packet sent by the terminal.

In this embodiment of this application, the PSA-UPF 1 may monitor the service packet according to the PDR, and send user plane rerouting trigger information to the SMF when detecting the preset service packet matching the PDR. The SMF may learn, based on the user plane rerouting triggering information, that the preset service for which the session with the PSA-UPF2 needs to be created and the session with the PSA-UPF1 needs to be deleted has been triggered. The SMF performs procedures of creating the session with the PSA-UPF2 and deleting the session with the PSA-UPF1. In this way, all service packets sent by the terminal access a data network by using the PSA-UPF2. It can be learned that in this embodiment of this application, user plane path adjustment based on service awareness can be implemented without a need to use a function entity planned on a third-party APP to sense and trigger the user plane rerouting. This improves operator network security.

Figure 9B:
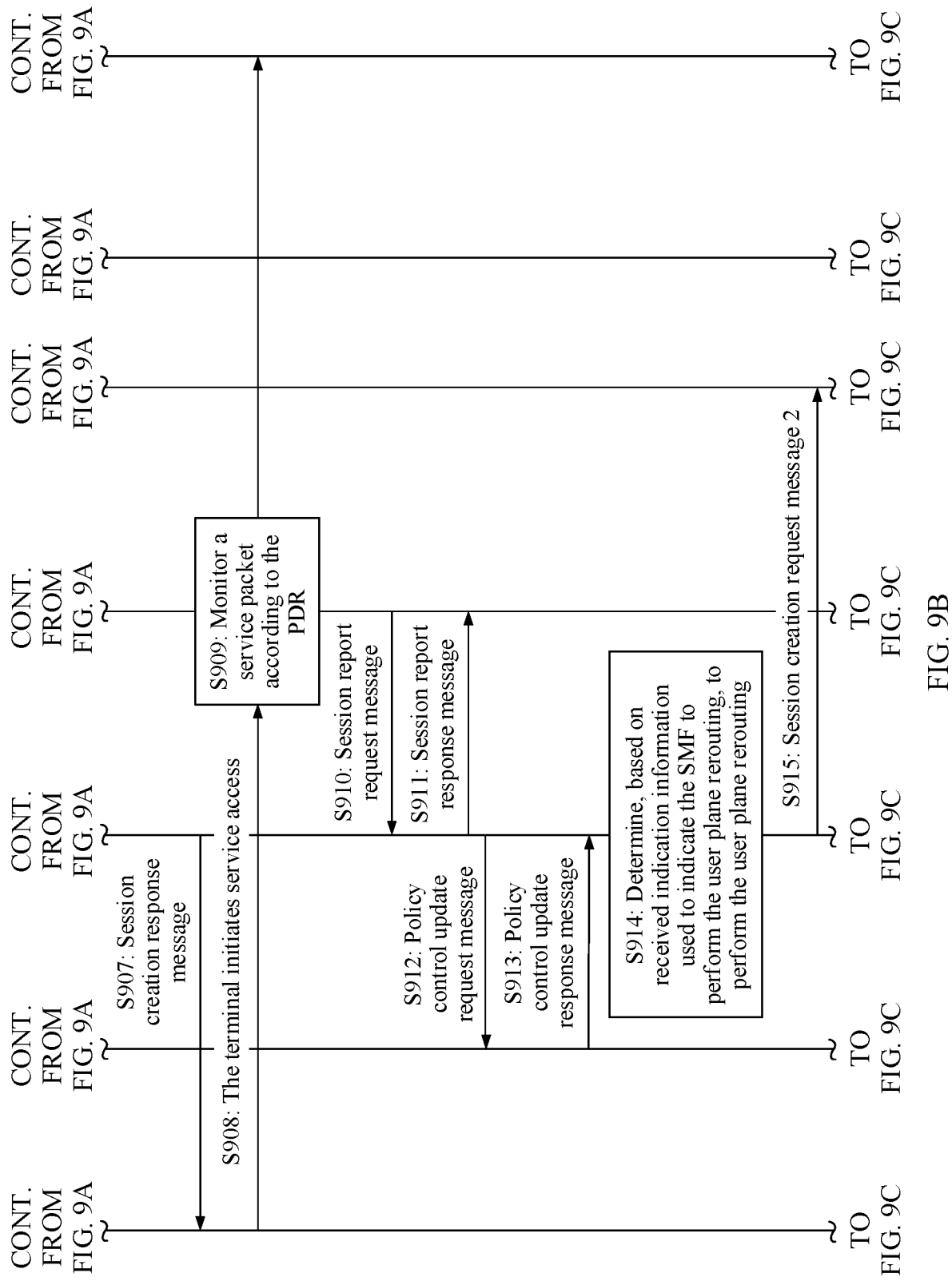
Figure 9C:
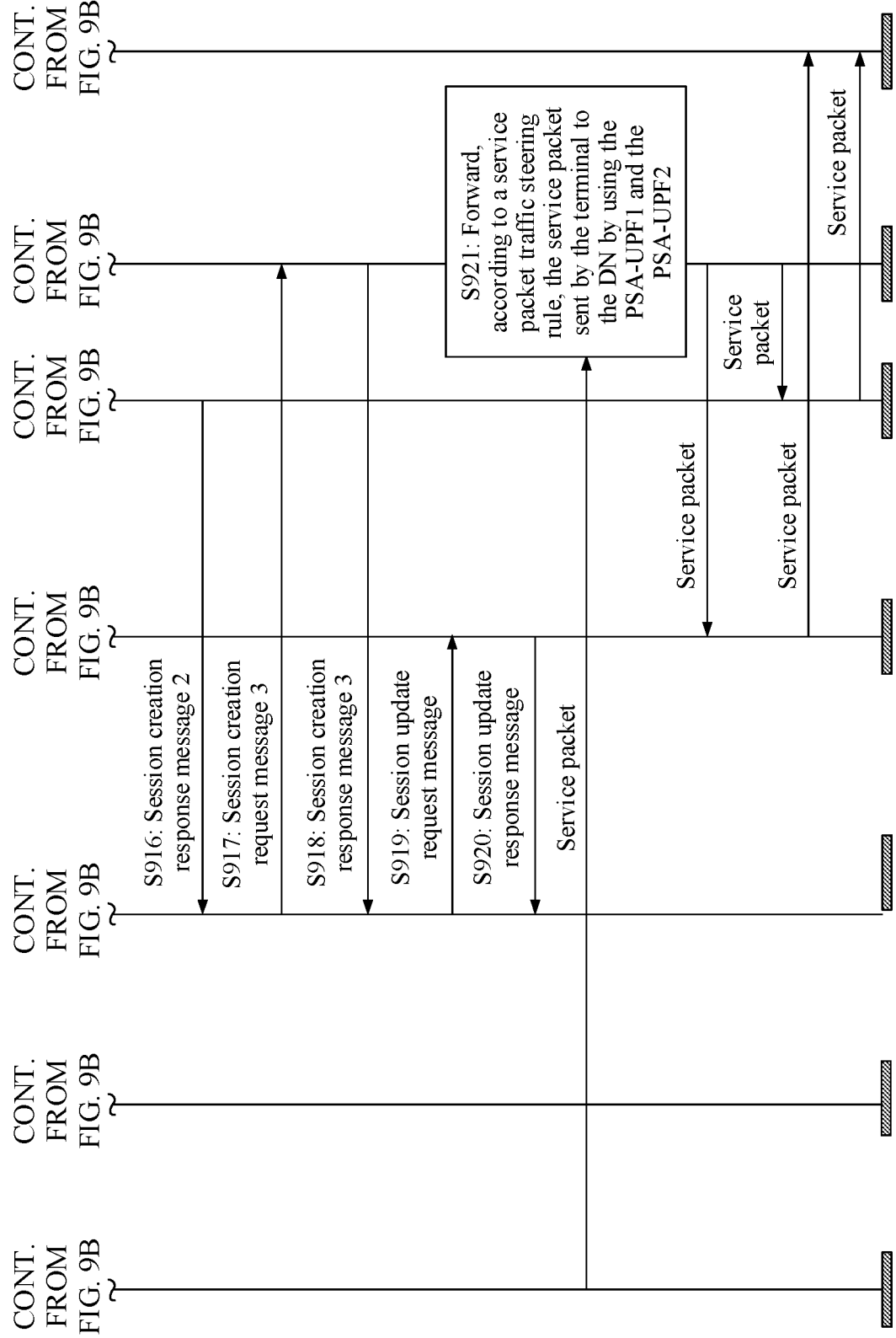

FIG. 9A, FIG. 9B, and FIG. 9C are a schematic flowchart of a user plane rerouting method according to another embodiment of this application. Based on the foregoing embodiment, this embodiment of this application describes the user plane rerouting method by using an example in which a PSA-UPF1 monitors a service packet (generated after an SMF obtains a policy used to trigger user plane rerouting from a PCF) according to a PDR delivered by the SMF and sends user plane rerouting trigger information to the SMF when detecting a preset service packet matching the PDR, so that the SMF reports the user plane rerouting trigger information to the PCF and performs, after receiving indication information that is sent by the PCF and that is used to indicate the SMF to perform the user plane rerouting, user plane rerouting operations of creating a session between a UPF performing traffic steering and a PSA-UPF2, delivering a service packet traffic steering rule, and the like.

In this embodiment of this application, the policy used to trigger user plane rerouting is preset on the PCF. For example, when accessing a preset service, a terminal needs to select a specific UPF as the UPF performing traffic steering to insert session information and another specific UPF as a new local anchor PSA-UPF2 to create new session information, and deliver, to the UPF performing traffic steering, a policy used to indicate to separately distribute a service flow (including a plurality of service packets) by using a source anchor PSA-UPF1 and a new local anchor PSA-UPF2, and the like.

For example, for an IPv4 session and/or a non-multi-homed IPv6 session, the UPF performing traffic steering in this embodiment of this application may be a ULCL-UPF. For a multi-homed IPv6 session, the UPF performing traffic steering in this embodiment of this application may be a BP-UPF.

As shown in FIG. 9A, FIG. 9B, and FIG. 9C, the method in this embodiment of this application may include the following steps.

Step S901: The terminal sends a session creation request message to the SMF.

Step S902: The SMF sends a policy control creation request message to the PCF, where the policy control creation request message is used to indicate to obtain the policy used to trigger the user plane rerouting.

Step S903: The PCF sends a policy control creation response message to the SMF, where the policy control creation response message carries the policy used to trigger the user plane rerouting. Certainly, the policy control creation response message may further carry another policy such as a charging and control policy.

For example, the policy control creation response message may include indication information of a policy control request triggers cause. As shown in Table 5, the indication information of the policy control request triggers cause may include but is not limited to a rerouting policy (or referred to as the policy used to trigger the user plane rerouting) that is used to indicate the SMF to report a policy control update request when detecting that the terminal accesses the preset service for which user plane rerouting needs to be performed.

TABLE 5

A schematic table showing the indication information of the policy control request triggers cause

| Policy control request triggers cause | Description | Reporting condition |
|---|---|---|
| Rerouting policy | The terminal accesses a preset service for which user plane rerouting needs to be performed. | UPF -> SMF -> PCF |

Step S904: The SMF generates the corresponding PDR according to the policy that is obtained from the PCF and that is used to trigger the user plane rerouting, where the PDR may include but is not limited to: PDI and a URR.

Step S905: The SMF sends a session creation request message 1 to the PSA-UPF1, where the session creation request message 1 is used to indicate to create a session between the SMF and the PSA-UPF1.

For example, the session creation request message 1 carries the PDR, and the PDR may include but is not limited to: the PDI and the URR.

Structures of URR information elements in the session creation request message 1 are shown in Table 1 and Table 2. Details are not described herein again.

Step S906: The PSA-UPF1 sends a session creation response message 1 to the SMF.

Step S907: The SMF sends the session creation response message to the terminal.

Step S908: The terminal initiates service access.

Step S909: The PSA-UPF1 monitors the service packet according to the PDR.

For example, if the PSA-UPF1 detects the preset service packet that matches the PDI in the PDR, the PSA-UPF1 performs step S910.

Step S910: The PSA-UPF1 sends a session report request message to the SMF.

For example, when detecting the preset service packet that matches the PDI in the PDR, the PSA-UPF1 sends the session report request message to the SMF according to the URR in the PDR (including reporting triggers that indicate service rerouting), where the session report request message carries the user plane rerouting trigger information.

A structure of a usage report (Usage Report) IE in the session report request message is shown in Table 3 and Table 4. Details are not described herein again.

Step S911: The SMF sends a session report response message to the PSA-UPF1.

Step S912: The SMF sends a policy control update request message to the PCF.

For example, the SMF determines, based on the user plane rerouting triggering information in the session report request message, that the preset service for which the session between the UPF performing traffic steering and the PSA-UPF2 needs to be created and to which the service packet traffic steering rule needs to be delivered has been triggered, and sends the policy control update request message to the PCF, where the policy control update request message may carry the user plane rerouting triggering information.

Step S913: The PCF sends a policy control update response message to the SMF, where the policy control update response message may carry indication information used to indicate the SMF to perform the user plane rerouting.

Step S914: The SMF determines, based on the received indication information used to indicate the SMF to perform the user plane rerouting, to perform the user plane rerouting.

Step S915: The SMF sends a session creation request message 2 to the PSA-UPF2, where the session creation request message 2 is used to indicate to create a session between the SMF and the PSA-UPF2.

Step S916: The PSA-UPF2 sends a session creation response message 2 to the SMF.

Step S917: The SMF sends a session creation request message 3 to the UPF performing traffic steering, where the session creation request message 3 is used to indicate to create a session between the SMF and the UPF performing traffic steering.

For example, the session creation request message 3 carries the service packet traffic steering rule allocated to the UPF performing traffic steering, so that the UPF performing traffic steering distributes the service packet by using the source anchor PSA-UPF1 and the new local anchor PSA-UPF2 according to the service packet traffic steering rule.

Step S918: The UPF performing traffic steering sends a session creation response message 3 to the SMF.

Step S919: The SMF sends a session update request message to the PSA-UPF1, where the session update request message is used to indicate to update the PDR in the PSA-UPF1.

For example, the session update request message is used to indicate to update interface tunnel information carried in an FAR action of an original PDR in the PSA-UPF1 to interface tunnel information between the PSA-UPF1 and the UPF performing traffic steering (for example, an interface address and/or an F-TEID).

Step S920: The PSA-UPF1 sends a session update response message to the SMF.

Step S921: The UPF performing traffic steering forwards, according to the service packet traffic steering rule, the service packet sent by the terminal to a DN by using the PSA-UPF1 and the PSA-UPF2.

For example, the UPF performing traffic steering may distribute, according to the service packet traffic steering rule, the preset service packet to the PSA-UPF2 for accessing the data network, and may still forward another service packet to the PSA-UPF1 for continuing to access the data network.

In this embodiment of this application, the PSA-UPF 1 may monitor the service packet according to the PDR, and send the user plane rerouting trigger information to the SMF when detecting the preset service packet matching the PDR. The SMF may learn, based on the user plane rerouting triggering information, that the preset service for which the session needs to be created between the UPF performing traffic steering and the PSA-UPF2 and to which the service packet traffic steering rule is delivered has been triggered and is reported to the PCF. The SMF further performs a session creation procedure between the UPF performing traffic steering and the PSA-UPF2 after receiving the indication information that is sent by the PCF and that is used to indicate the SMF to perform the user plane rerouting, to distribute a specific service flow to a corresponding anchor UPF for accessing the data network. It can be learned that in this embodiment of this application, user plane path adjustment based on service awareness can be implemented without a need to use a function entity planned on a third-party APP to sense and trigger the user plane rerouting. This improves operator network security.

Figure 10:
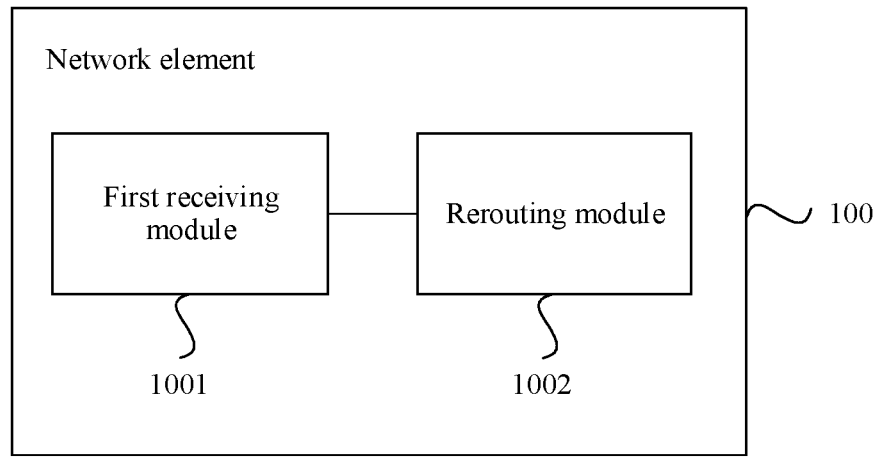
FIG. 10 is a schematic diagram depicting a structure of a network element according to an embodiment of this application.

FIG. 10 is a schematic diagram depicting a structure of a network element according to an embodiment of this application. Optionally, the network element provided in this embodiment of this application may be a first network element. As shown in FIG. 10, a network element 100 in this embodiment of this application may include a first receiving module 1001 and a rerouting module 1002.

The first receiving module 1001 is configured to receive user plane rerouting trigger information sent by a second network element, where the user plane rerouting trigger information is sent when the second network element detects a preset service packet that matches a packet detection rule (PDR), and the PDR is used to indicate matching information and an execution rule that are corresponding to preset service packet triggering the user plane rerouting.

The rerouting module 1002 is configured to perform the user plane rerouting based on the user plane rerouting trigger information.

In a possible implementation, the PDR includes: packet detection information (PDI) and a usage reporting rule (URR). The PDI is used to indicate the matching information corresponding to the preset service packet. The URR is used to indicate the execution rule corresponding to the preset service packet.

In a possible implementation, the first network element further includes:
- a first generation module, configured to generate the PDR according to a preset policy used to trigger the user plane rerouting; and
- a first sending module, configured to send the PDR to the second network element.

In a possible implementation, the first network element further includes:
- an obtaining module, configured to obtain a preset policy, from a third network element, that is in a third network element and that is used to trigger the user plane rerouting;
- a second generation module, configured to generate the PDR according to the policy; and
- a second sending module, configured to send the PDR to the second network element.

In a possible implementation, the first network element further includes:
- a third sending module, configured to send an activation message to the second network element, where the activation message is used to indicate to activate the preset PDR in the second network element.

In a possible implementation, the PDR is carried in a first session creation request message sent by the first network element to the second network element, and the first session creation request message is used to indicate to create a session between the first network element and the second network element.

In a possible implementation, the activation message is carried in a second session creation request message sent by the first network element to the second network element, and the second session creation request message is used to indicate to create a session between the first network element and the second network element.

In a possible implementation, the rerouting module 1002 is specifically configured to:

- send a first session request message to a fourth network element and a second session request message to a fifth network element, where the first session request message is used to indicate to create or update a session between the first network element and the fourth network element, the second session request message is used to indicate to create or update a session between the first network element and the fifth network element, and the second session request message carries a service packet traffic steering rule allocated to the fifth network element; and/or
- send a session update request message to the second network element, where the session update request message is used to indicate to update the PDR in the second network element.

In a possible implementation, the rerouting module 1002 includes:
- a creation unit, configured to create the session with the fourth network element; and
- a deletion unit, configured to delete the session with the second network element.

In a possible implementation, the creation unit is specifically configured to:
- send a third session creation request message to the fourth network element, where the third session creation request message is used to indicate to create the session between the first network element and the fourth network element.

In a possible implementation, the deletion unit is specifically configured to:
- send a session delete request message to the second network element, where the session delete request message is used to indicate to delete the session between the first network element and the second network element.

In a possible implementation, the first network element further includes:
- a fourth sending module, configured to send the user plane rerouting trigger information to the third network element; and
- a second receiving module, configured to receive indication information sent by the third network element, where the indication information is used to indicate the first network element to perform the user plane rerouting.

The network element 100 provided in this embodiment of this application may be configured to perform technical solutions related to the first network element in the foregoing user plane rerouting method embodiment of this application. Implementation principles and technical effects of the network element 100 are similar to those in the method embodiments. Details are not described herein again.

Figure 11:
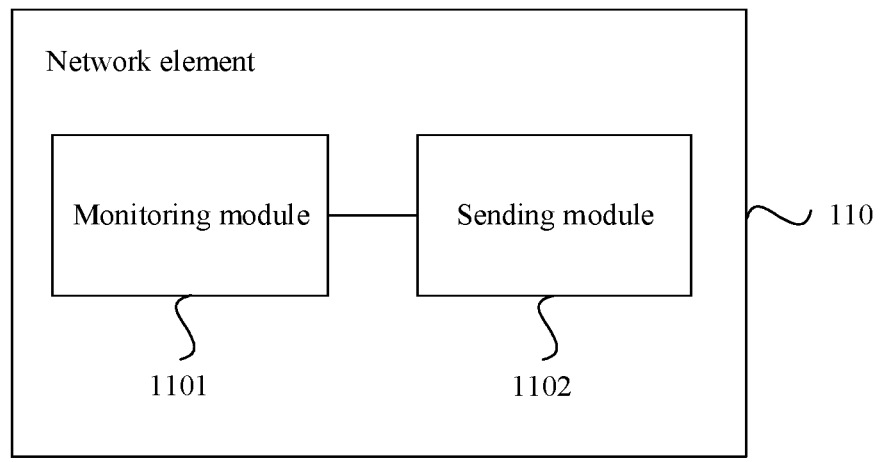
FIG. 11 is a schematic diagram depicting a structure of a network element according to another embodiment of this application.

FIG. 11 is a schematic diagram depicting a structure of a network element according to another embodiment of this application. Optionally, the network element provided in this embodiment of this application may be a first network element. As shown in FIG. 11, a network element 110 in this embodiment of this application may include a monitoring module 1101 and a sending module 1102.

The monitoring module 1101 is configured to monitor a service packet according to a packet detection rule (PDR), where the PDR is used to indicate matching information and an execution rule that are corresponding to a preset service packet triggering user plane rerouting.

The sending module 1102 is configured to send user plane rerouting trigger information to a second network element according to the execution rule when the monitoring module detects the preset service packet that matches the PDR.

In a possible implementation, the PDR includes: packet detection information (PDI) and a usage reporting rule (URR). The PDI is used to indicate the matching information corresponding to the preset service packet. The URR is used to indicate the execution rule corresponding to the preset service packet.

In a possible implementation, the monitoring module 1101 is specifically configured to:
  determine attribute information of the service packet;
  match the attribute information with the PDI;
  if the attribute information matches the PDI, detect that the service packet is the preset service packet that matches the PDR; and/or
  if the attribute information does not match the PDI, detect that the service packet is not the preset service packet that matches the PDR.

In a possible implementation, the first network element further includes:
  a first receiving module, configured to receive the PDR sent by the second network element, where the PDR is generated by the second network element according to a preset policy used to trigger the user plane rerouting, or the PDR is generated after the second network element obtains a policy used to trigger the user plane rerouting from a third network element.

In a possible implementation, the first network element further includes:
  a second receiving module, configured to receive an activation message sent by the second network element, where the activation message is used to indicate to activate the preset PDR in the first network element.

In a possible implementation, the PDR is carried in a first session creation request message received by the first network element from the second network element, and the first session creation request message is used to indicate to create a session between the second network element and the first network element.

In a possible implementation, the activation message is carried in a second session creation request message received by the first network element from the second network element, and the second session creation request message is used to indicate to create a session between the second network element and the first network element.

In a possible implementation, the first network element further includes:
  a third receiving module, configured to receive a session update request message sent by the second network element, where the session update request message is used to indicate to update the PDR in the first network element.

In a possible implementation, the first network element further includes:
  a fourth receiving module, configured to receive a session delete request message sent by the second network element, where the session delete request message is used to indicate to delete the session between the second network element and the first network element.

The network element 100 provided in this embodiment of this application may be configured to perform technical solutions related to the second network element in the foregoing user plane rerouting method embodiment of this application. Implementation principles and technical effects of the network element 100 are similar to those in the method embodiments. Details are not described herein again.

Figure 12:
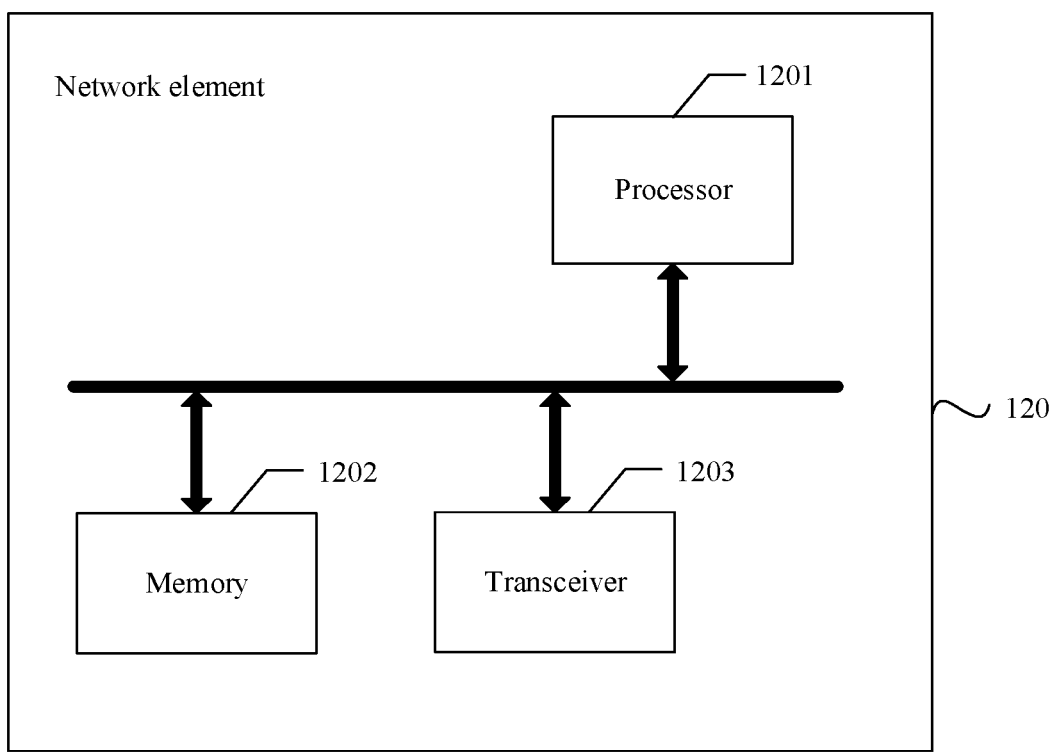
FIG. 12 is a schematic diagram depicting a structure of a network element according to another embodiment of this application.

FIG. 12 is a schematic diagram depicting a structure of a network element according to another embodiment of this application. As shown in FIG. 12, a network element 120 in this embodiment may include a processor 1201 and a memory 1202. Optionally, the network element 120 may further include a transceiver 1203 configured to send and receive information and/or a message. The memory 1202 is configured to store program instructions, the processor 1201 is configured to invoke and execute the program instructions stored in the memory 1202. When the processor 1201 executes the program instructions stored in the memory 1202, the network element 120 is configured to perform the technical solutions related to the first network element or the second network element in the foregoing user plane rerouting method embodiments of this application. Implementation principles and technical effects thereof are similar to those in the method embodiments. Details are not described herein again.

An embodiment of this application further provides a computer-readable storage medium. The computer-readable storage medium stores instructions. When the instructions are run on a computer, the computer performs technical solutions related to a first network element or a second network element in the foregoing user plane rerouting method embodiment of this application. Implementation principles and technical effects thereof are similar to those in the method embodiments. Details are not described herein again.

An embodiment of this application further provides a chip system. The chip system includes a processor, and may further include a memory, configured to implement technical solutions of a first network element or a second network element in the foregoing user plane rerouting method embodiment of this application. Implementation principles and technical effects thereof are similar to those in the method embodiments. Details are not described herein again. The chip system may include a chip, or may include a chip and another discrete component.

An embodiment of this application further provides a program. When being executed by a processor, the program is used to perform technical solutions related to a first network element or a second network element in the foregoing user plane rerouting method embodiment of this application. Implementation principles and technical effects thereof are similar to those in the method embodiments. Details are not described herein again.

An embodiment of this application provides a computer program product that includes instructions. When the instructions are run on a computer, the computer performs the technical solutions related to the first network element or the second network element in the foregoing user plane rerouting method embodiment of this application. Implementation principles and technical effects thereof are similar to those in the method embodiments. Details are not described herein again.

In the embodiments of this application, the processor may be a general-purpose processor, a digital signal processor, an application-specific integrated circuit, a field-programmable gate array or another programmable logic device, a discrete gate or transistor logic device, or a discrete hardware component, and can implement or perform the methods, steps, and logical block diagrams disclosed in the embodiments of this application. The general-purpose processor may be a microprocessor, any conventional processor, or the like. The steps of the method disclosed with reference to the embodiments of this application may be directly performed by a hardware processor, or may be performed by using a combination of hardware in the processor and a software module.

In the embodiments of this application, the memory may be a non-volatile memory, such as a hard disk drive (HDD) or a solid-state drive (SSD), or may be a volatile memory, such as a random-access memory (RAM). The memory is any other medium that can be configured to carry or store expected program code in a form of instructions or a data structure and that can be accessed by a computer, but is not limited thereto.

In the several embodiments provided in this application, it should be understood that the disclosed apparatus and method may be implemented in other manners. For example, the described apparatus embodiment is merely an example. For example, division into units is merely logical function division and may be other division during actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, and may be located in one position, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of hardware and a software functional unit.

A person of ordinary skill in the art may understand that sequence numbers of the foregoing processes do not mean execution sequences in various embodiments of this application. The execution sequences of the processes should be determined based on functions and internal logic of the processes, and should not constitute any limitation on the implementation processes of the embodiments of this application.

All or some of the foregoing embodiments may be implemented by using software, hardware, firmware, or any combination thereof. When software is used to implement the methods, all or some of the methods may be implemented in a form of a computer program product. The computer program product includes one or more computer instructions. When the computer program instructions are loaded and executed on a computer, all or some of the procedures or functions according to the embodiments of this application are generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A user plane rerouting method, comprising:
receiving, by a first network element, user plane rerouting trigger information sent by a second network element, wherein the user plane rerouting trigger information is sent when the second network element detects a preset service packet that matches a packet detection rule (PDR), and the PDR indicates matching information and an execution rule that corresponds to the preset service packet triggering the user plane rerouting; and
performing, by the first network element, the user plane rerouting based on the user plane rerouting trigger information;
wherein the performing, by the first network element, the user plane rerouting based on the user plane rerouting trigger information comprises:
sending, by the first network element, a first session request message to a fourth network element and a second session request message to a fifth network element, wherein the first session request message indicates to create or update a session between the first network element and the fourth network element, the second session request message indicates to create or update a session between the first network element and the fifth network element, and the second session request message carries a service packet traffic steering rule allocated to the fifth network element; and
sending, by the first network element, a session update request message to the second network element, wherein the session update request message indicates to update the PDR in the second network element.

2. The method according to claim 1, wherein:
the PDR comprises packet detection information (PDI) and a usage reporting rule (URR),
the PDI indicates the matching information corresponding to the preset service packet, and
the URR indicates the execution rule corresponding to the preset service packet.

3. The method according to claim 1, wherein the method further comprises:
generating, by the first network element, the PDR according to a preset policy used to trigger the user plane rerouting; and
sending the PDR to the second network element.

4. The method according to claim 3, wherein the PDR is carried in a first session creation request message sent by the first network element to the second network element, and the first session creation request message indicates to create a session between the first network element and the second network element.

5. The method according to claim 1, wherein the method further comprises:
obtaining, by the first network element from a third network element, a preset policy that is in the third network element and that triggers the user plane rerouting; and generating, by the first network element, the PDR according to the preset policy and sending the PDR to the second network element.

6. The method according to claim 1, wherein the method further comprises:
sending, by the first network element, an activation message to the second network element, wherein the activation message indicates to activate a preset PDR in the second network element.

7. The method according to claim 6, wherein the activation message is carried in a second session creation request message sent by the first network element to the second network element, and the second session creation request message indicates to create a session between the first network element and the second network element.

8. The method according to claim 1, wherein the performing, by the first network element, the user plane rerouting based on the user plane rerouting trigger information further comprises:
creating, by the first network element, a session with the fourth network element; and
deleting, by the first network element, the session with the second network element.

9. The method according to claim 8, wherein the creating, by the first network element, the session with the fourth network element comprises:
sending, by the first network element, a third session creation request message to the fourth network element, wherein the third session creation request message indicates to create the session between the first network element and the fourth network element.

10. A user plane rerouting method, comprising:
monitoring, by a first network element, a service packet according to a packet detection rule (PDR), wherein the PDR indicates matching information and an execution rule that corresponds to a preset service packet triggering user plane rerouting; and
if the first network element detects the preset service packet that matches the PDR, sending, by the first network element, user plane rerouting trigger information to a second network element according to the execution rule;
wherein the sending, by the first network element, the user plane rerouting information to the second network element according to the execution rule comprises:
sending, by the first network element, a first session request message to a fourth network element and a second session request message to a fifth network element, wherein the first session request message indicates to create or update a session between the first network element and the fourth network element, the second session request message indicates to create or update a session between the first network element and the fifth network element, and the second session request message carries a service packet traffic steering rule allocated to the fifth network element; and
sending, by the first network element, a session update request message to the second network element, wherein the session update request message indicates to update the PDR in the second network element.

11. The method according to claim 10, wherein the PDR comprises packet detection information (PDI) and a usage reporting rule (URR),
wherein the PDI indicates the matching information corresponding to the preset service packet, and
wherein the URR indicates the execution rule corresponding to the preset service packet.

12. The method according to claim 11, wherein the monitoring, by the first network element, the service packet according to the PDR comprises:
determining, by the first network element, attribute information of the service packet;
matching, by the first network element, the attribute information with the PDI;
if the attribute information matches the PDI, the service packet detected by the first network element is the preset service packet that matches the PDR; and
if the attribute information does not match the PDI, the service packet detected by the first network element is not the preset service packet that matches the PDR.

13. The method according to claim 10, wherein the method further comprises:
receiving, by the first network element, the PDR sent by the second network element, wherein the PDR is generated by the second network element according to a preset policy used to trigger the user plane rerouting, or the PDR is generated after the second network element obtains a policy used to trigger the user plane rerouting from a third network element.

14. The method according to claim 13, wherein the PDR is carried in a first session creation request message received by the first network element from the second network element, and the first session creation request message indicates to create a session between the second network element and the first network element.

15. The method according to claim 10, wherein the method further comprises:
receiving, by the first network element, an activation message sent by the second network element, wherein the activation message indicates to activate the preset PDR in the first network element.

16. The method according to claim 15, wherein the activation message is carried in a second session creation request message received by the first network element from the second network element, and the second session creation request message indicates to create a session between the second network element and the first network element.

17. A network element, wherein the network element is a first network element, and the first network element comprises:
a transmitter;
a receiver; and
a processor, wherein:
the receiver is configured to receive user plane rerouting trigger information sent by a second network element, wherein the user plane rerouting trigger information is sent when the second network element detects a preset service packet that matches a packet detection rule (PDR), and the PDR indicates matching information and an execution rule corresponding to the preset service packet triggering the user plane rerouting;
the processor is configured to perform the user plane rerouting based on the user plane rerouting trigger information; and
the transmitter is configured by the processor to perform the user plane rerouting based on the user plane rerouting trigger information by configuring the transmitter to:
send a first session request message to a fourth network element and a second session request message to a fifth network element, wherein the first session request message indicates to create or update a session between the first network element and the fourth network element, the second session request message indicates to create or update a session between the first network element and the fifth network element, and the second session request message carries a service packet traffic steering rule allocated to the fifth network element; and send a session update request message to the second network element, wherein the session update request message indicates to update the PDR in the second network element.

18. The first network element according to claim 17, wherein the PDR comprises packet detection information (PDI) and a usage reporting rule (URR), wherein the PDI indicates the matching information corresponding to the preset service packet, and wherein the URR indicates the execution rule corresponding to the preset service packet.

19. The first network element according to claim 17, wherein:

the processor is further configured to generate the PDR according to a preset policy used to trigger the user plane rerouting; and the transmitter is configured to send the PDR to the second network element.

* * * * *